(12) United States Patent  
Aoki

(10) Patent No.: US 7,411,776 B2  
(45) Date of Patent: Aug. 12, 2008

(54) MULTILAYER CAPACITOR ARRAY

(75) Inventor: Takashi Aoki, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/819,097

(22) Filed: Jun. 25, 2007

(65) Prior Publication Data

US 2008/0013250 A1   Jan. 17, 2008

(30) Foreign Application Priority Data

Jul. 12, 2006   (JP)   ............................. 2006-191833

(51) Int. Cl.  
*H01G 4/228* (2006.01)

(52) U.S. Cl. ................. 361/306.3; 361/306.1; 361/311; 361/313; 361/307; 361/308.1

(58) Field of Classification Search ............... 361/306.3, 361/306.1, 302–305, 311–313, 307, 308.1, 361/308.2, 321.1, 321.2, 309  
See application file for complete search history.

(56) References Cited

U.S. PATENT DOCUMENTS

| | | | |
|---|---|---|---|
| 6,266,229 B1 * | 7/2001 | Naito et al. ............... | 361/306.3 |
| 6,370,010 B1 * | 4/2002 | Kuroda et al. ............. | 361/306.1 |
| 6,577,491 B1 * | 6/2003 | Ohtsuka et al. ........... | 361/306.3 |
| 6,621,682 B1 * | 9/2003 | Takakuwa et al. ......... | 361/306.3 |
| 6,819,543 B2 * | 11/2004 | Vieweg et al. ............ | 361/306.3 |
| 6,934,145 B2 * | 8/2005 | Hsieh et al. ............... | 361/321.2 |
| 6,972,942 B2 * | 12/2005 | Ritter et al. ............... | 361/306.3 |

FOREIGN PATENT DOCUMENTS

| | | |
|---|---|---|
| JP | A-04-242309 | 8/1992 |
| JP | A 11-26291 | 1/1999 |
| JP | A-11-067507 | 3/1999 |
| JP | A-2004-273701 | 9/2004 |
| JP | A-2006-165514 | 6/2006 |

* cited by examiner

*Primary Examiner*—Nguyen T Ha  
(74) *Attorney, Agent, or Firm*—Oliff & Berridge, PLC

(57) ABSTRACT

A multilayer capacitor array comprises a multilayer body, and first to fourth terminal conductors and first and second outer connecting conductors formed on the multilayer body. The multilayer body includes a first electrode group having a plurality of first and second inner electrodes, and a second electrode group having a plurality of third and fourth inner electrodes. The first to fourth inner electrodes are connected to the first to fourth terminal conductors, respectively. In the plurality of first inner electrodes, at least one first inner electrode whose number is smaller than the total number of the first inner electrodes by at least one is connected to the first terminal conductor. In the plurality of second inner electrodes, at least one second inner electrode whose number is smaller than the total number of the second inner electrodes by at least one is connected to the second terminal conductor.

4 Claims, 21 Drawing Sheets

MULTILAYER CAPACITOR ARRAY

BACKGROUND OF THE INVENTION

1. Field of the Invention

The present invention relates to a multilayer capacitor array.

2. Related Background Art

As electronic devices have been reducing their size and thickness, capacitors mounted on them have been desired to be integrated. Therefore, a capacitor array including a plurality of capacitors within one chip has recently been under study. For example, one comprising a multilayer body in which inner electrode layers each provided with a plurality of inner electrodes arranged in parallel and dielectric layers are alternately laminated, and a plurality of terminal conductors formed on the multilayer body has been known (see, for example, Japanese Patent Application laid-Open No. HEI 11-26291).

On the other hand, power supplies for central processing units (CPUs) mounted in digital electronic devices have been lowering their voltage while increasing their load current. This has made it very difficult for fluctuations in power voltage to be held below a tolerable level, whereby a multilayer capacitor known as decoupling capacitor has been connected to the power supplies. When the load current fluctuates transiently, the multilayer capacitor supplies a current to the CPU, thereby suppressing the fluctuation in power voltage.

Recently, as the CPUs have further been increasing their frequency, their load current has been becoming faster and greater. Therefore, the multilayer capacitors employed in decoupling capacitors have been demanded to increase their capacity and equivalent series resistance (ESR).

SUMMARY OF THE INVENTION

However, the equivalent series resistance has not been considered in the multilayer capacitor array described in Japanese Patent Application laid-Open No. HEI 11-26291.

For solving the problem mentioned above, it is an object of the present invention to provide a multilayer capacitor array which can regulate the equivalent series resistance.

Meanwhile, in a typical multilayer capacitor array, all the inner electrodes are connected to their corresponding terminal conductors through lead conductors. Therefore, the lead conductors connected to the terminal conductors exist by the number of inner electrodes, whereby the equivalent series resistance becomes smaller. When the number of laminated dielectric layers and inner electrodes is increased in order to attain a greater capacity in the multilayer capacitor array, the number of lead conductors also increases. Since the resistance components of the lead conductors connected to terminal conductors are connected in parallel to the terminal conductors, the equivalent series resistance of the multilayer capacitor array further decreases as the number of lead conductors connected to the terminal conductors increases. For example, the equivalent series resistance will decrease in the multilayer capacitor array described in Japanese Patent Application laid-Open No. HEI 11-26291 if its capacitance is made greater by increasing the number of laminated layers so as to respond to greater capacity, since all the inner electrodes are directly connected to the terminal conductors. Thus, demands for greater capacity and greater equivalent series resistance in a multilayer capacitor are contradictory to each other.

Therefore, the inventors conducted diligent studies concerning a multilayer capacitor which can satisfy demands for increasing the capacity and equivalent series resistance. As a result, the inventors have found a new fact that the equivalent series resistance can be adjusted to a desirable value if inner electrodes are connected to outer connecting conductors formed on a surface of a multilayer body while the number of lead conductors can be changed, even when the number of dielectric layers and inner electrodes is held constant. The inventors have also found a new fact that the equivalent series resistance can be adjusted to a desirable value if inner electrodes are connected to outer connecting conductors formed on a surface of a multilayer body while positions of lead conductors in the laminating direction of the multilayer body can be changed. In particular, the equivalent series resistance can be adjusted such as to become greater if the number of lead conductors is made smaller than that of inner electrodes.

In view of such results of studies, an embodiment the present invention provides a multilayer capacitor array comprising a multilayer body having a plurality of dielectric layers laminated, and a plurality of outer conductors formed on the multilayer body; wherein the plurality of outer conductors include first to fourth terminal conductors and first and second outer connecting conductors electrically insulated from each other; wherein the multilayer body includes a first electrode group having a plurality of first inner electrodes and a plurality of second inner electrodes, and a second electrode group having a third inner electrode and a fourth inner electrode; wherein the first and second electrode groups are arranged in parallel in a direction orthogonal to a laminating direction of the plurality of dielectric layers within the multilayer body; wherein at least one first inner electrode in the plurality of first inner electrodes and at least one second inner electrode in the plurality of second inner electrodes are positioned so as to oppose each other with at least one dielectric layer in between; wherein the third and fourth inner electrodes are positioned so as to oppose each other with at least one dielectric layer in between; wherein each of the first inner electrodes is electrically connected to the first outer connecting conductor through a lead conductor; wherein each of the second inner electrodes is electrically connected to the second outer connecting conductor through a lead conductor; wherein the third inner electrode is electrically connected to the third terminal conductor through a lead conductor; wherein the fourth inner electrode is electrically connected to the fourth terminal conductor through a lead conductor; wherein at least one first inner electrode whose number is smaller than the total number of the first inner electrodes by at least one in the plurality of first inner electrodes is electrically connected to the first terminal conductor through a lead conductor; and wherein at least one second inner electrode whose number is smaller than the total number of the second inner electrodes by at least one in the plurality of second inner electrodes is electrically connected to the second terminal conductor through a lead conductor.

In the above-mentioned multilayer capacitor array, only a part of the first and second inner electrodes are connected to terminal conductors through lead conductors. When not all but only a part of the first inner and second inner electrodes are thus connected to the terminal conductors through the lead conductors, the equivalent series resistance of a capacitor formed by the plurality of first and second inner electrodes and plurality of dielectric layers can be regulated.

Preferably, the plurality of first and second inner electrodes are positioned so as to oppose each other, with at least one dielectric layer in between each pair. This can increase the capacitance of a capacitor formed by the plurality of first and second inner electrodes and plurality of dielectric layers.

Preferably, the plurality of outer conductors further include third and fourth outer connecting conductors; the second electrode group has a plurality of the third and fourth inner electrodes; each of the third inner electrodes is electrically connected to the third outer connecting conductor through a lead conductor; each of the fourth inner electrodes is electrically connected to the fourth outer connecting conductor through a lead conductor; at least one third inner electrode whose number is smaller than the total number of the third inner electrodes by at least one in the plurality of third inner electrodes is electrically connected to the third terminal conductor through a lead conductor; and at least one fourth inner electrode whose number is smaller than the total number of the fourth inner electrodes by at least one in the plurality of fourth inner electrodes is electrically connected to the fourth terminal conductor through a lead conductor.

In this case, only a part of the third and fourth inner electrodes are connected to terminal conductors through lead conductors. When not all but only a part of the third and fourth inner and electrodes are thus connected to the terminal conductors through the lead conductors, the equivalent series resistance of a capacitor formed by the plurality of third and fourth inner electrodes and plurality of dielectric layers can be regulated. It will be particularly preferred in this case if the plurality of third and fourth inner electrodes are positioned so as to oppose each other, with at least one dielectric layer in between each pair. This can increase the capacitance of a capacitor formed by the plurality of third and fourth inner electrodes and plurality of dielectric layers.

The plurality of first and second inner electrodes and the plurality of dielectric layers may form a first capacitor, the plurality of third and fourth inner electrodes and the plurality of dielectric layers may form a second capacitor, and the first capacitor may have an equivalent series resistance different from that of the second capacitor.

The present invention can provide a multilayer capacitor array which can regulate the equivalent series resistance.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
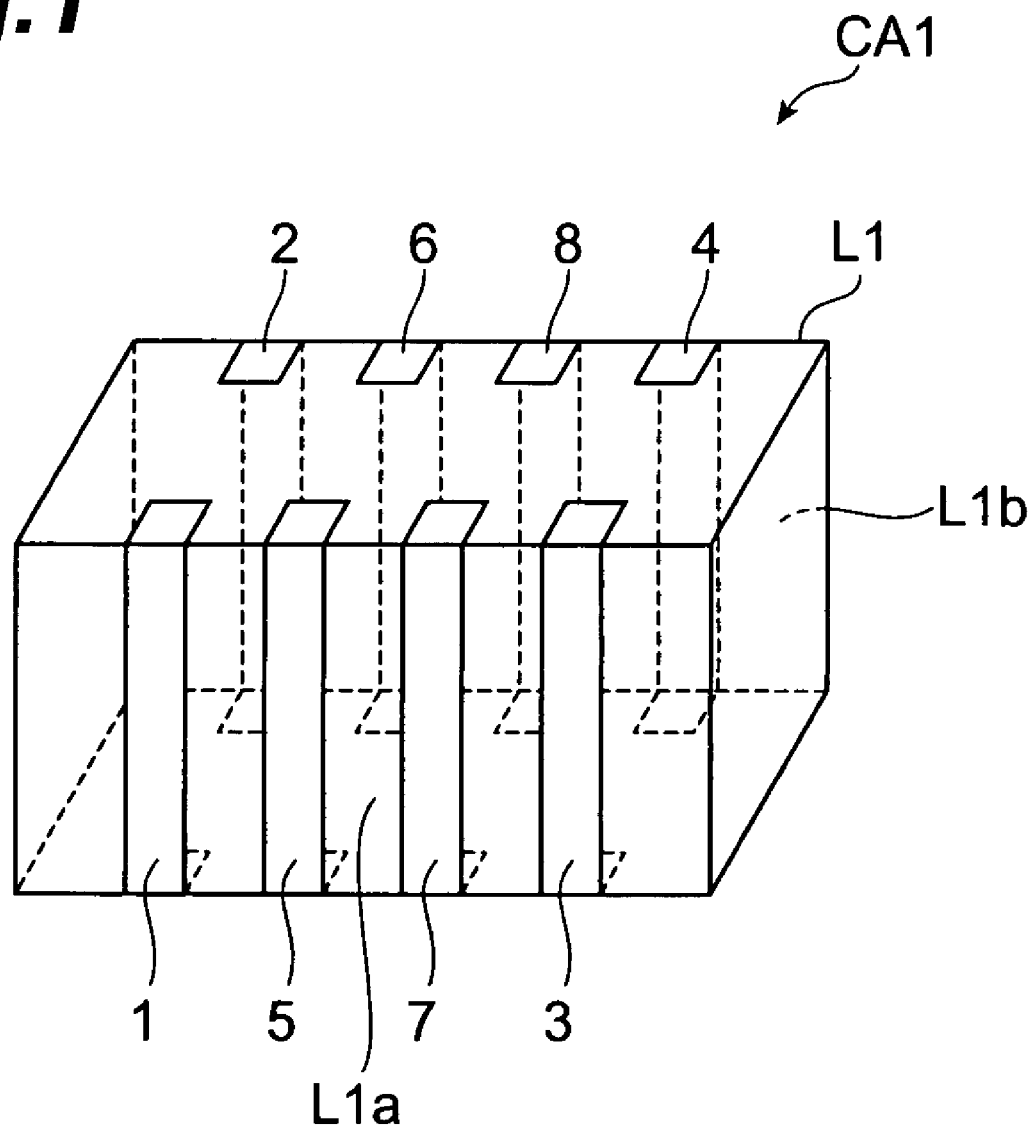
FIG. 1 is a perspective view of the multilayer capacitor array in accordance with a first embodiment.

In the following, preferred embodiments will be explained in detail with reference to the accompanying drawings. In the explanation, the same constituents or those having the same functions will be referred to with the same numerals while omitting their overlapping explanations. Terms such as "left" and "right" used in the explanation correspond to the lateral direction in the drawings.

First Embodiment

Figure 2:
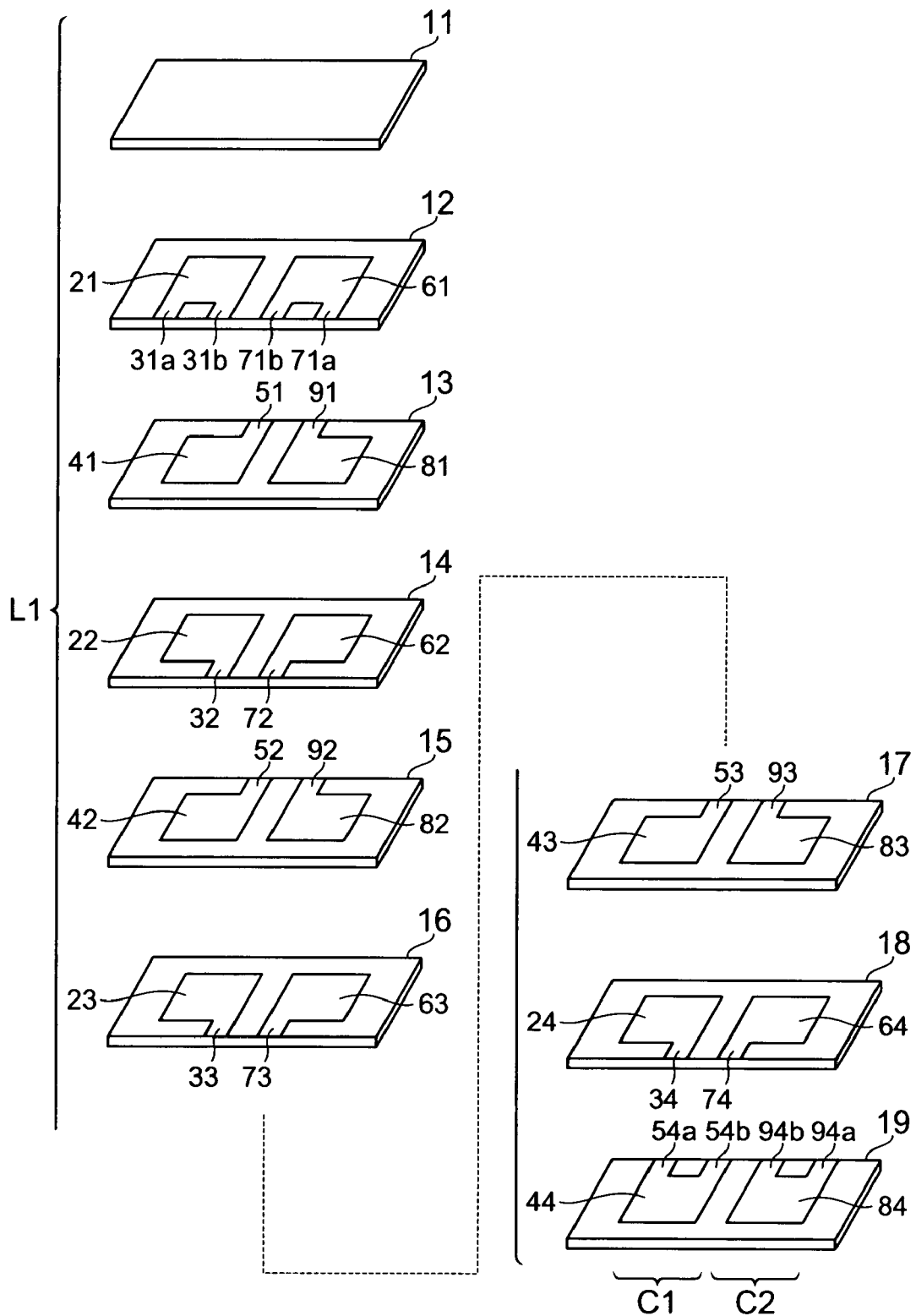
FIG. 2 is an exploded perspective view of the multilayer body included in the multilayer capacitor array in accordance with the first embodiment.

With reference to FIGS. 1 and 2, the structure of multilayer capacitor array CA1 in accordance with a first embodiment will be explained. FIG. 1 is a perspective view of the multilayer capacitor array in accordance with the first embodiment. FIG. 2 is an exploded perspective view of the multilayer body included in the multilayer capacitor array in accordance with the first embodiment.

As shown in FIG. 1, the multilayer capacitor array CA1 in accordance with the first embodiment comprises a multilayer body L1 having a substantially rectangular parallelepiped form and a plurality of outer conductors 1 to 8 formed on side faces of the multilayer body L1. The outer conductors 1 to 8 are formed, for example, by attaching and burning a conductive paste, which contains a conductive metal powder and a glass frit, onto outer surfaces of the multilayer body. A plating layer may be formed on the burned outer conductors when necessary. The plurality of outer conductors 1 to 8 are formed such as to be electrically insulated from each other on the surfaces of the multilayer body L1.

The plurality of outer conductors include first to fourth terminal conductors 1 to 4 and first to fourth outer connecting conductors 5 to 8. The first and third terminal conductors 1, 3 and first and third outer connecting conductors 5, 7 are positioned on a first side face L1a in the side faces parallel to the laminating direction of the multilayer body L1 which will be explained later, i.e., the first side face L1a that is a side face extending in the longitudinal direction of the side faces orthogonal to the laminating direction of the multilayer body L1. The first and third terminal conductors 1, 3 and first and third outer connecting conductors 5, 7 are formed in the order of the first terminal conductor 1, first outer connecting conductor 5, third outer connecting conductor 7, and third terminal conductor 3 from the left side to right side in FIG. 1.

The second and fourth terminal conductors 2, 4 and second and fourth outer connecting conductors 6, 8 are positioned on a second side face L1b in the side faces parallel to the laminating direction of the multilayer body L1, i.e., the second side face L1b that is a side face extending in the longitudinal direction of the side faces orthogonal to the laminating direction of the multilayer body L1 and opposing the first side face L1a. The second and fourth terminal conductors 2, 4 and second and fourth outer connecting conductors 6, 8 are formed in the order of the second terminal conductor 2, second outer connecting conductor 6, fourth outer connecting conductor 8, and fourth terminal conductor 4 from the left side to right side in FIG. 1.

As shown in FIG. 2, the multilayer body L1 is constructed by laminating a plurality of (9 in this embodiment) dielectric layers 11 to 19. Each of the dielectric layers 11 to 19 is constituted by a sintered body of a ceramic green sheet including a dielectric ceramic, for example. The laminating direction of the dielectric layers 11 to 19 in the multilayer body L1 will be simply referred to as "laminating direction" hereinafter. In the actual multilayer capacitor array CA1, the dielectric layers 11 to 19 are integrated to such an extent that their boundaries are indiscernible.

The multilayer body L1 includes first and second electrode groups E1, E2. The first electrode group E1 includes a plurality of (4 each in this embodiment) first and second inner electrodes 21 to 24, 41 to 44. The second electrode group E2 includes a plurality of (4 each in this embodiment) third and fourth inner electrodes 61 to 64, 81 to 84. The first and second electrode groups E1, E2 are arranged in parallel in a direction orthogonal to the laminating direction of the dielectric layers 11 to 19 within the multilayer body L1. Each of the inner electrodes 21 to 24, 41 to 44, 61 to 64, 81 to 84 is constituted by a sintered body of a conductive paste, for example.

The plurality of first and second inner electrodes 21 to 24, 41 to 44 oppose each other, with their corresponding one layer of the dielectric layers 12 to 18 in between each pair. The plurality of third and fourth inner electrodes 61 to 64, 81 to 84 oppose each other, with their corresponding one layer of the dielectric layers 12 to 18 in between each pair. When seen in the laminating direction, the plurality of first inner electrodes 21 to 24 have no areas opposing any of the third and fourth inner electrodes 61 to 64, 81 to 84. When seen in the laminating direction, the plurality of second inner electrodes 41 to 44 have no areas opposing any of the third and fourth inner electrodes 61 to 64, 81 to 84. On the other hand, when seen in the laminating direction, the plurality of third inner electrodes 61 to 64 have no areas opposing any of the first and second inner electrodes 21 to 24, 41 to 44. When seen in the laminating direction, the plurality of fourth inner electrodes 81 to 84 have no areas opposing any of the first and second inner electrodes 21 to 24, 41 to 44.

In the multilayer capacitor array CA1, the first and third inner electrodes 21 to 24, 61 to 64 are positioned on the same layers in the laminating direction. Therefore, the first and third inner electrodes 21, 61 are positioned between the dielectric layers 11, 12. The first and third inner electrodes 22, 62 are positioned between the dielectric layers 13, 14. The first and third inner electrodes 23, 63 are positioned between the dielectric layers 15, 16. The first and third inner electrodes 24, 64 are positioned between the dielectric layers 17, 18.

In the multilayer capacitor array CA1, the second and fourth inner electrodes 41 to 44, 81 to 84 are also positioned on the same layers in the laminating direction. Therefore, the second and fourth inner electrodes 41, 81 are positioned between the dielectric layers 12, 13. The second and fourth inner electrodes 42, 82 are positioned between the dielectric layers 14, 15. The second and fourth inner electrodes 43, 83 are positioned between the dielectric layers 16, 17. The second and fourth inner electrodes 44, 84 are positioned between the dielectric layers 18, 19.

Each of the first and third inner electrodes 21 to 24, 61 to 64 has a rectangular form. The rectangular first and third inner electrodes 21 to 24, 61 to 64 are positioned in this order from the left side to right side of FIG. 2. The first and third inner electrodes 21 to 24, 61 to 64 are positioned such as to be out of contact with each other.

Each of the second and fourth inner electrodes 41 to 44, 81 to 84 has a rectangular form. The rectangular second and fourth inner electrodes 41 to 44, 81 to 84 are positioned in this order from the left side to right side of FIG. 2. The second and fourth inner electrodes 41 to 44, 81 to 84 are positioned such as to be out of contact with each other.

The first inner electrode 21 is formed with a lead conductor 31a extending so as to be drawn to the first side face L1a of the multilayer body L1. The first inner electrodes 21 to 24 are formed with respective lead conductors 31b, 32 to 34 extending so as to be drawn to the first side face L1a of the multilayer body L1.

The lead conductors 31a, 31b are integrally formed with the first inner electrode 21, and extend therefrom so as to reach the first side face L1a of the multilayer body L1. The lead conductor 32 is integrally formed with the first inner electrode 22, and extends therefrom so as to reach the first side face L1a of the multilayer body L1. The lead conductor 33 is integrally formed with the first inner electrode 23, and extends therefrom so as to reach the first side face L1a of the multilayer body L1. The lead conductor 34 is integrally formed with the first inner electrode 24, and extends therefrom so as to reach the first side face L1a of the multilayer body L1.

The first inner electrodes 21 to 24 are electrically connected to the first outer connecting conductor 5 through the lead conductors 31b, 32 to 34, respectively. Consequently, the first inner electrodes 21 to 24 are electrically connected to each other through the first outer connecting conductor 5.

Among the four first inner electrodes 21 to 24, at least one first inner electrode 21 whose number is smaller than 4 which is the total number of the first inner electrodes by at least one, i.e., one first inner electrode 21, is electrically connected to the first terminal conductor 1 through the lead conductor 31a. Since the first inner electrodes 21 to 24 are electrically connected to each other through the first outer connecting conductor 5, the first inner electrodes 22 to 24 are also electrically connected to the first terminal conductor 1 through the first outer connecting conductor 5. Consequently, the first inner electrodes 21 to 24 are connected in parallel.

The second inner electrode 44 is formed with a lead conductor 54a extending so as to be drawn to the second side face L1b of the multilayer body L1. The second inner electrodes 41 to 44 are formed with respective lead conductors 51 to 53, 54b extending so as to be drawn to the second side face L1b of the multilayer body L1.

The lead conductor 51 is integrally formed with the second inner electrode 41, and extends therefrom so as to reach the second side face L1b of the multilayer body L1. The lead conductor 52 is integrally formed with the second inner electrode 42, and extends therefrom so as to reach the second side face L1b of the multilayer body L1. The lead conductor 53 is integrally formed with the second inner electrode 43, and extends therefrom so as to reach the second side face L1b of the multilayer body L1. The lead conductors 54a, 54b are integrally formed with the second inner electrode 44, and extend therefrom so as to reach the second side face L1b of the multilayer body L1.

The second inner electrodes 41 to 44 are electrically connected to the second outer connecting conductor 6 through the lead conductors 51 to 53, 54b, respectively. Consequently, the second inner electrodes 41 to 44 are electrically connected to each other through the second outer connecting conductor 6.

Among the four second inner electrodes 41 to 44, at least one second electrode 44 whose number is smaller than 4 which is the total number of the second inner electrodes by at least one, i.e., one second inner electrode 44, is electrically connected to the second terminal conductor 2 through the lead conductor 54a. Since the second inner electrodes 41 to 44 are electrically connected to each other through the second outer connecting conductor 6, the second inner electrodes 41 to 43 are also electrically connected to the second terminal conductor 2 through the second outer connecting conductor 6. Consequently, the second inner electrodes 41 to 44 are connected in parallel.

The third inner electrode 61 is formed with a lead conductor 71a extending so as to be drawn to the first side face L1a of the multilayer body L1. The third inner electrodes 61 to 64 are formed with respective lead conductors 71b, 72 to 74 extending so as to be drawn to the first side face L1a of the multilayer body L1.

The lead conductors 71a, 71b are integrally formed with the third inner electrode 61, and extend therefrom so as to reach the first side face L1a of the multilayer body L1. The lead conductor 72 is integrally formed with the third inner electrode 62, and extends therefrom so as to reach the first side face L1a of the multilayer body L1. The lead conductor 73 is integrally formed with the third inner electrode 63, and extends therefrom so as to reach the first side face L1a of the multilayer body L1. The lead conductor 74 is integrally formed with the third inner electrode 64, and extends therefrom so as to reach the first side face L1a of the multilayer body L1.

The third inner electrodes 61 to 64 are electrically connected to the third outer connecting conductor 7 through the lead conductors 71b, 72 to 74, respectively. Consequently, the third inner electrodes 61 to 64 are electrically connected to each other through the third outer connecting conductor 7.

Among the four third inner electrodes 61 to 64, at least one third inner electrode 61 whose number is smaller than 4 which is the total number of the third inner electrodes by at least one, i.e., one third inner electrode 61, is electrically connected to the third terminal conductor 3 through the lead conductor 71a. Since the third inner electrodes 61 to 64 are electrically connected to each other through the third outer connecting conductor 7, the third inner electrodes 62 to 64 are also electrically connected to the third terminal conductor 3 through the third outer connecting conductor 7. Consequently, the third inner electrodes 61 to 64 are connected in parallel.

The fourth inner electrode 84 is formed with a lead conductor 94a extending so as to be drawn to the second side face L1b of the multilayer body L1. The fourth inner electrodes 81 to 84 are formed with respective lead conductors 91 to 93, 94b extending so as to be drawn to the second side face L1b of the multilayer body L1.

The lead conductor 91 is integrally formed with the fourth inner electrode 81, and extends therefrom so as to reach the second side face L1b of the multilayer body L1. The lead conductor 92 is integrally formed with the fourth inner electrode 82, and extends therefrom so as to reach the second side face L1b of the multilayer body L1. The lead conductor 93 is integrally formed with the fourth inner electrode 83, and extends therefrom so as to reach the second side face L1b of the multilayer body L1. The lead conductor 94a, 94b are integrally formed with the fourth inner electrode 84, and extend therefrom so as to reach the second side face L1b of the multilayer body L1.

The fourth inner electrodes 81 to 84 are electrically connected to the fourth outer connecting conductor 8 through the lead conductors 91 to 93, 94b, respectively. Consequently, the fourth inner electrodes 81 to 84 are electrically connected to each other through the fourth outer connecting conductor 8.

Among the four fourth inner electrodes 81 to 84, at least one fourth electrode 84 whose number is smaller than 4 which is the total number of the fourth inner electrodes by at least one, i.e., one fourth inner electrode 84, is electrically connected to the fourth terminal conductor 4 through the lead conductor 94a. Since the fourth inner electrodes 81 to 84 are electrically connected to each other through the fourth outer connecting conductor 8, the fourth inner electrodes 81 to 83 are also electrically connected to the fourth terminal conductor 4 through the fourth outer connecting conductor 8. Consequently, the fourth inner electrodes 81 to 84 are connected in parallel.

In the multilayer capacitor array CA1, as a result of the foregoing, a first capacitor C1 is formed by the plurality of first and second inner electrodes 21 to 24, 41 to 44 and the plurality of dielectric layers 12 to 18, more specifically by the plurality of first and second inner electrodes 21 to 24, 41 to 44 and the dielectric layers 12 to 18 held one by one between the plurality of first and second inner electrodes 21 to 24, 41 to 44. Also, in the multilayer capacitor array CA1, a second capacitor C2 is formed by the plurality of third and fourth inner electrodes 61 to 64, 81 to 84 and the plurality of dielectric layers 12 to 18, more specifically by the plurality of third and fourth inner electrodes 61 to 64, 81 to 84 and the dielectric layers 12 to 18 held one by one between the plurality of third and fourth inner electrodes 61 to 64, 81 to 84.

In the first capacitor C1 in the multilayer capacitor array CA1, the number of first inner electrode 21 connected to the first terminal conductor 1 through the lead conductor 31a is 1, which is smaller than the total number (4 in this embodiment) of the first inner electrodes 21 to 24. Also, the number of second inner electrode 44 connected to the second terminal conductor 2 through the lead conductor 54a is 1, which is smaller than the total number (4 in this embodiment) of the second inner electrodes 41 to 44. When the second terminal conductor 1 is concerned, the resistance component of the first outer connecting conductor 5 is connected in series to the first terminal conductor 1. When the second terminal conductor 2 is concerned, the resistance component of the second outer connecting conductor 6 is connected in series to the second terminal conductor 2. These make the first capacitor C1 have an equivalent series resistance greater than that of the conventional capacitor included in a multilayer capacitor array in which all the inner electrodes are connected to their corresponding terminal conductors through lead conductors. Also, a greater equivalent series resistance prevents impedance from dropping drastically at a resonance frequency, thus making it possible to increase the bandwidth.

In the second capacitor C2 in the multilayer capacitor array CA1, the number of third inner electrode 61 connected to the third terminal conductor 3 through the lead conductor 71a is 1, which is smaller than the total number (4 in this embodiment) of the third electrodes 61 to 64. Also, the number of fourth inner electrode 84 connected to the fourth terminal conductor 4 through the lead conductor 94a is 1, which is smaller than the total number (4 in this embodiment) of the fourth inner electrodes 81 to 84. When the third terminal conductor 3 is concerned, the resistance component of the third outer connecting conductor 7 is connected in series to the third terminal conductor 3. When the fourth terminal conductor 4 is concerned, the resistance component of the fourth outer connecting conductor 8 is connected in series to the fourth terminal conductor 4. These make the second capacitor C2 have an equivalent series resistance greater than that of the conventional capacitor included in a multilayer capacitor array in which all the inner electrodes are connected to their corresponding terminal conductors through lead conductors. Also, a greater equivalent series resistance prevents impedance from dropping drastically at a resonance frequency, thus making it possible to increase the bandwidth.

Thus, the multilayer capacitor array CA1 allows each of the first and second capacitors C1, C2 included therein to have an equivalent series resistance greater than that of the conventional capacitor in which all the inner electrodes are connected to their corresponding terminal conductors through lead conductors.

As explained in the foregoing, the multilayer capacitor array CA1 can regulate the equivalent series resistance.

The first capacitor C1 can set the equivalent series resistance to a desirable value by adjusting at least one of the number of first inner electrode 21 electrically connected to the first terminal conductor 1 through the lead conductor 31a and the number of second inner electrode 44 electrically connected to the second terminal conductor 2 through the lead conductor 54a. The second capacitor C2 can set the equivalent series resistance to a desirable value by adjusting at least one of the number of third inner electrode 61 electrically connected to the third terminal conductor 3 through the lead conductor 71a and the number of fourth inner electrode 84 electrically connected to the fourth terminal conductor 4 through the lead conductor 94a. Consequently, the multilayer capacitor array CA1 can regulate the equivalent series resistance easily and accurately.

Also, the first capacitor C1 can set the equivalent series resistance to a desirable value by adjusting at least one of the position of the first inner electrode 21 electrically connected to the first terminal conductor 1 through the lead conductor 31a in the laminating direction of the multilayer body L1 and the position of the second inner electrode 44 electrically connected to the second terminal conductor 2 through the lead conductor 54a in the laminating direction of the multilayer body L1. The second capacitor C2 can set the equivalent series resistance to a desirable value by adjusting at least one of the position of the third inner electrode 61 electrically connected to the third terminal conductor 3 through the lead conductor 71a in the laminating direction of the multilayer body L1 and the position of the fourth inner electrode 84 electrically connected to the fourth terminal conductor 4 through the lead conductor 94a in the laminating direction of the multilayer body L1.

In the multilayer capacitor array CA1, the plurality of first and second inner electrodes 21 to 24, 41 to 44 are positioned so as to oppose each other, with one of the dielectric layers 12 to 18 in between each pair. This can increase the capacitance of the first capacitor C1 formed by the first and second inner electrodes 21 to 24, 41 to 44 and dielectric layers 12 to 18. On the other hand, the plurality of third and fourth inner electrodes 61 to 64, 81 to 84 are positioned so as to oppose each other, with one of the dielectric layers 12 to 18 in between each pair. This can increase the capacitance of the second capacitor C2 formed by the third and fourth inner electrodes 61 to 64, 81 to 84 and dielectric layers 12 to 18. These allow the capacitors C1, C2 formed in the multilayer capacitor array CA1 to regulate the equivalent series resistance such as to make it greater while increasing the capacitance.

Second Embodiment

Figure 3:
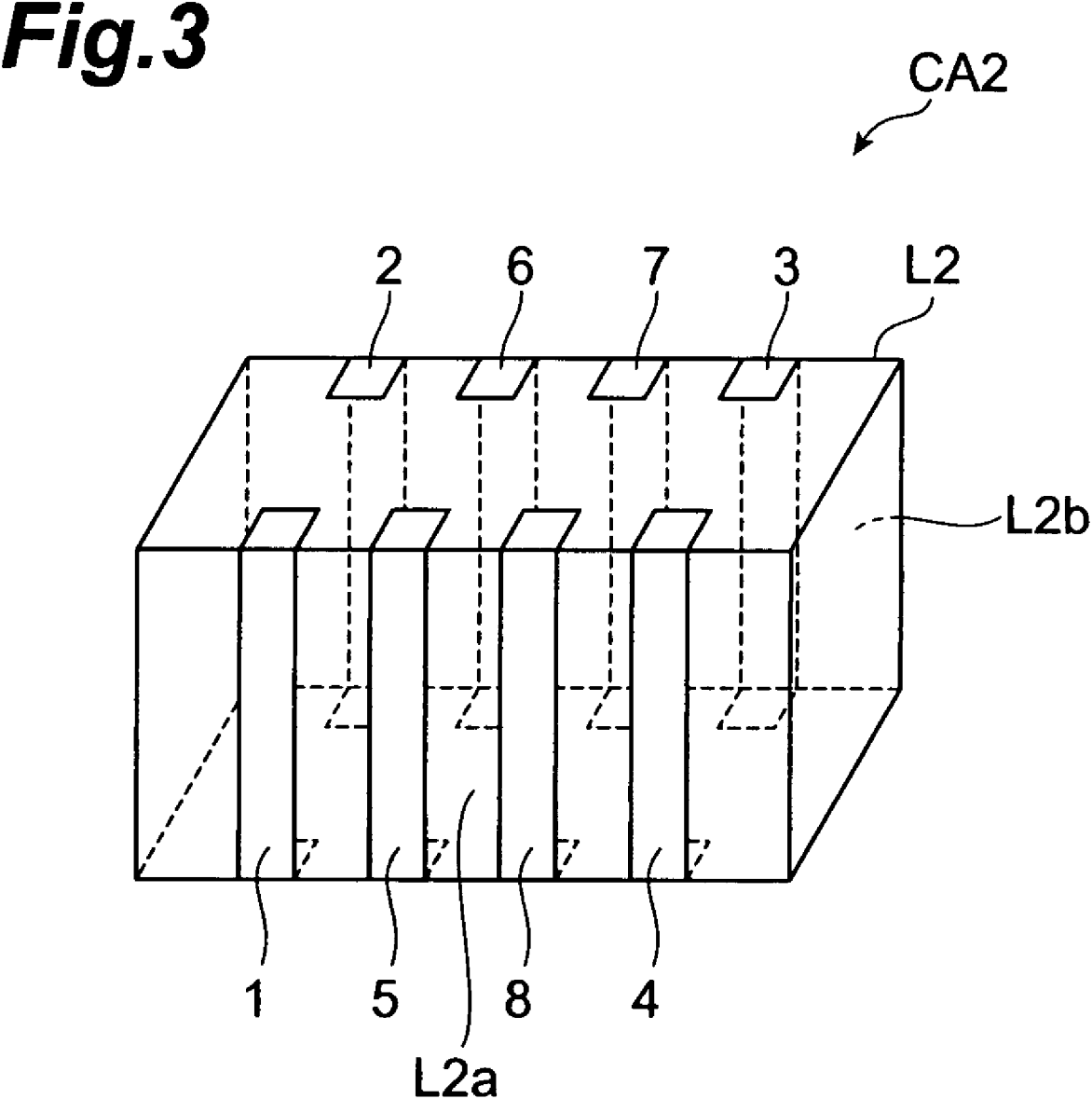
FIG. 3 is a perspective view of the multilayer capacitor array in accordance with a second embodiment.
Figure 4:
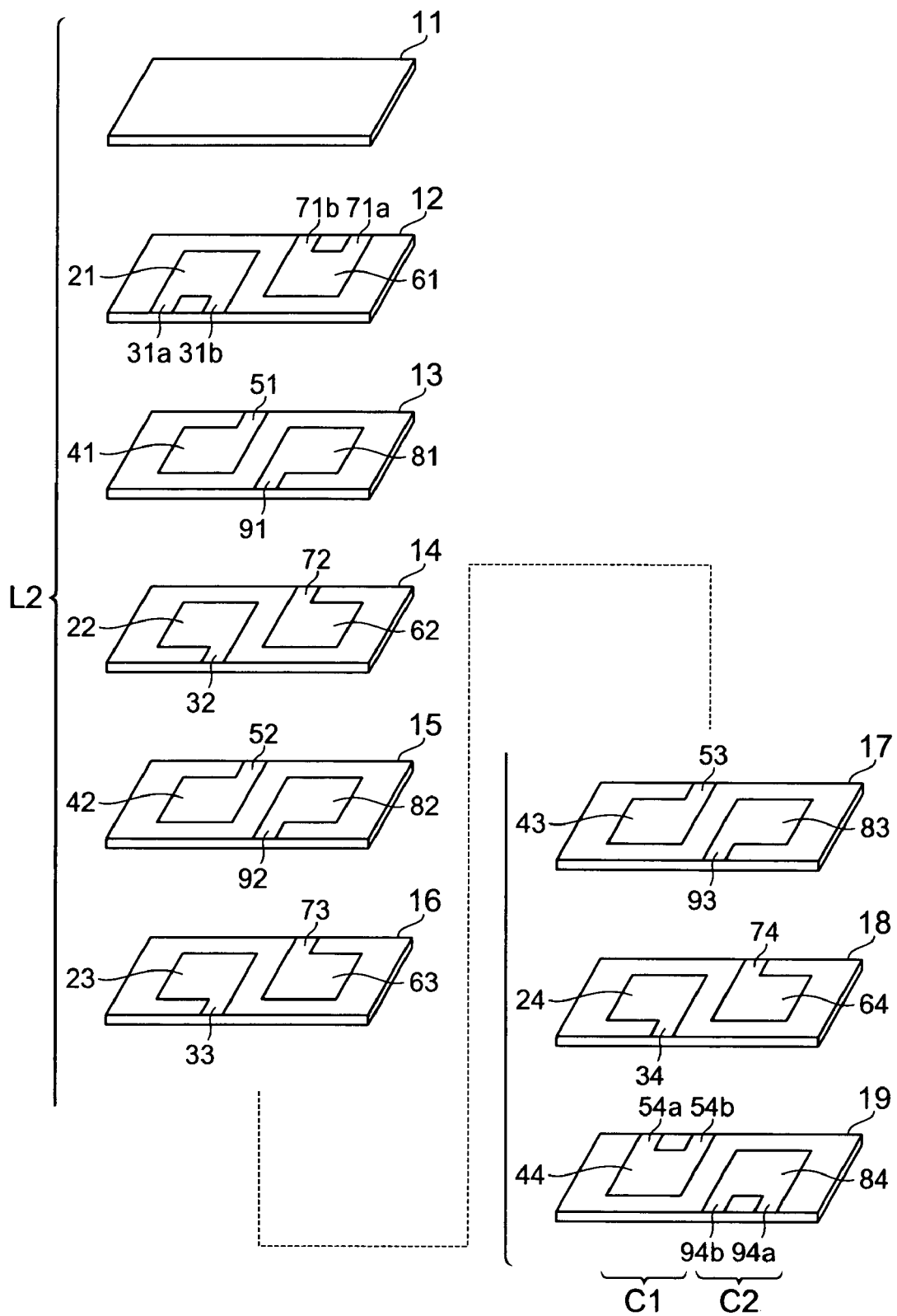
FIG. 4 is an exploded perspective view of the multilayer body included in the multilayer capacitor array in accordance with the second embodiment.

With reference to FIGS. 3 and 4, the structure of multilayer capacitor array CA2 in accordance with a second embodiment will be explained. The multilayer capacitor array CA2 in accordance with the second embodiment differs from the multilayer capacitor array CA1 in accordance with the first embodiment in terms of the arrangement of outer conductors formed on the multilayer body. FIG. 3 is a perspective view of the multilayer capacitor array in accordance with the second embodiment. FIG. 4 is an exploded perspective view of the multilayer body included in the multilayer capacitor array in accordance with the second embodiment.

As shown in FIG. 3, the multilayer capacitor array CA2 in accordance with the second embodiment comprises a multilayer body L2 having a substantially rectangular parallelepiped form, and first to fourth terminal conductors 1 to 4 and first to fourth outer connecting conductors 5 to 8 which are a plurality of outer conductors formed on side faces of the multilayer body L2.

The first and fourth terminal conductors 1, 4 and first and fourth outer connecting conductors 5, 8 are positioned on a first side face L2a in the side faces parallel to the laminating direction of the multilayer body L2. The first and fourth terminal conductors 1, 4 and first and fourth outer connecting conductors 5, 8 are formed in the order of the first terminal conductor 1, first outer connecting conductor 5, fourth outer connecting conductor 8, and fourth terminal conductor 4 from the left side to right side in FIG. 3.

The second and third terminal conductors 2, 3 and second and third outer connecting conductors 6, 7 are positioned on a second side face L2b opposing the first side face 2a in the side faces parallel to the laminating direction of the multilayer body L2. The second and third terminal conductors 2, 3 and second and third outer connecting conductors 6, 7 are formed in the order of the second terminal conductor 2, second outer connecting conductor 6, third outer connecting conductor 7, and third terminal conductor 3 from the left side to right side in FIG. 3.

As shown in FIG. 4, the multilayer body L2 is constructed by laminating a plurality of (9 in this embodiment) dielectric layers 11 to 19. The multilayer body L2 includes a first electrode group having a plurality of (4 each in this embodiment) first and second inner electrodes 21 to 24, 41 to 44 and a second electrode group having a plurality of (4 each in this embodiment) third and fourth inner electrodes 61 to 64, 81 to 84. The first and second electrode groups are arranged in parallel in a direction orthogonal to the laminating direction of the dielectric layers 11 to 19 within the multilayer body L2.

The multilayer capacitor array CA2 includes a first capacitor C1 formed by the plurality of first and second inner electrodes 21 to 24, 41 to 44 and the dielectric layers 12 to 18 held one by one between the plurality of first and second inner electrodes 21 to 24, 41 to 44, and a second capacitor C2 formed by the plurality of third and fourth inner electrodes 61 to 64, 81 to 84 and the dielectric layers 12 to 18 held one by one between the plurality of third and fourth inner electrodes 61 to 64, 81 to 84.

In the multilayer capacitor array CA2, the first and third inner electrodes 21, 61, the first and third inner electrodes 22, 62, the first and third inner electrodes 23, 63, and the first and third inner electrodes 24, 64 are positioned on the same layers in the laminating direction. Also, the second and fourth inner electrodes 41, 81, the second and fourth inner electrodes 42, 82, the second and fourth inner electrodes 43, 83, and the second and fourth inner electrodes 44, 84 are positioned on the same layers in the laminating direction.

The first inner electrode 21 is formed with a lead conductor 31a extending so as to be drawn to the first side face L2a of the multilayer body L2. The first inner electrodes 21 to 24 are formed with respective lead conductors 31b, 32 to 34 extending so as to be drawn to the first side face L2a of the multilayer body L2.

The first inner electrode 21 is electrically connected to the first terminal conductor 1 through the lead conductor 31a. The first inner electrodes 21 to 24 are electrically connected to the first outer connecting conductor 5 through the lead conductors 31b, 32 to 34, respectively. As a result, not only the first inner electrode 21 but also the first inner electrodes 22 to 24 are electrically connected to the first terminal conductor 1 through the first outer connecting conductor 5.

The second inner electrode 44 is formed with a lead conductor 54a extending so as to be drawn to the second side face L2b of the multilayer body L2. The second inner electrodes 41 to 44 are formed with respective lead conductors 51 to 53, 54b extending so as to be drawn to the second side face L2b of the multilayer body L2.

The second inner electrode 44 is electrically connected to the second terminal conductor 2 through the lead conductor 54a. The second inner electrodes 41 to 44 are electrically connected to the second outer connecting conductor 6 through the lead conductors 51 to 53, 54b, respectively. As a result, not only the second inner electrode 44 but also the second inner electrodes 41 to 43 are electrically connected to the second terminal conductor 2 through the second outer connecting conductor 6.

The third inner electrode 61 is formed with a lead conductor 71a extending so as to be drawn to the second side face L2b of the multilayer body L2. The third inner electrodes 61 to 64 are formed with respective lead conductors 71b, 72 to 74 extending so as to be drawn to the second side face L2b of the multilayer body L2.

The third inner electrode 61 is electrically connected to the third terminal conductor 3 through the lead conductor 71a. The third inner electrodes 61 to 64 are electrically connected to the third outer connecting conductor 7 through the lead conductors 71b, 72 to 74, respectively. As a result, not only the third inner electrode 61 but also the third inner electrodes 62 to 64 are electrically connected to the third terminal conductor 3 through the third outer connecting conductor 7.

The fourth inner electrode 84 is formed with a lead conductor 94a extending so as to be drawn to the first side face L2a of the multilayer body L2. The fourth inner electrodes 81 to 84 are formed with respective lead conductors 91 to 93, 94b extending so as to be drawn to the first side face L2a of the multilayer body L2.

The fourth inner electrode 84 is electrically connected to the fourth terminal conductor 4 through the lead conductor 94a. The fourth inner electrodes 81 to 84 are electrically connected to the fourth outer connecting conductor 8 through the lead conductors 91 to 93, 94b, respectively. As a result, not only the fourth inner electrode 84 but also the fourth inner electrodes 81 to 83 are electrically connected to the fourth terminal conductor 4 through the fourth outer connecting conductor 8.

In the first capacitor C1 in the multilayer capacitor array CA2, the first terminal conductor 1 is electrically connected to the first inner electrodes 22 to 24 through the first outer connecting conductor 5 and first inner electrode 21. Also, in the first capacitor C1, the second terminal conductor 2 is electrically connected to the second inner electrodes 41 to 43 through the second outer connecting conductor 6 and second inner electrode 44. These make the first capacitor C1 have an equivalent series resistance greater than that of the conventional capacitor in a multilayer capacitor array in which all the inner electrodes are connected to their corresponding terminal conductors through lead conductors.

In the second capacitor C2 in the multilayer capacitor array CA2, the third terminal conductor 3 is electrically connected to the third inner electrodes 62 to 64 through the third outer connecting conductor 7 and third inner electrode 61. Also, in the second capacitor C2, the fourth terminal conductor 4 is electrically connected to the fourth inner electrodes 81 to 83 through the fourth outer connecting conductor 8 and fourth inner electrode 84. These make the second capacitor C2 have an equivalent series resistance greater than that of the conventional capacitor in a multilayer capacitor array in which all the inner electrodes are connected to their corresponding terminal conductors through lead conductors.

Thus, the multilayer capacitor array CA2 allows each of the first and second capacitors C1, C2 included therein to have an equivalent series resistance greater than that of the conventional capacitor in a multilayer capacitor array in which all the inner electrodes are connected to their corresponding terminal conductors through lead conductors.

As explained in the foregoing, the multilayer capacitor array CA2 can regulate the equivalent series resistance.

The first capacitor C1 can set the equivalent series resistance to a desirable value by adjusting the number or position in the laminating direction of at least one species of first inner electrode 21 and second inner electrode 44. The second capacitor C2 can set the equivalent series resistance to a desirable value by adjusting the number or position in the laminating direction of at least one species of third inner electrode 61 and fourth inner electrode 84. Consequently, the multilayer capacitor array CA2 can regulate the equivalent series resistance easily and accurately.

In the multilayer capacitor array CA2, the plurality of first and second inner electrodes 21 to 24, 41 to 44 are positioned so as to oppose each other, with one of the dielectric layers 12 to 18 in between each pair. On the other hand, the plurality of third and fourth inner electrodes 61 to 64, 81 to 84 are positioned so as to oppose each other, with one of the dielectric layers 12 to 18 in between each pair. These allow the capacitors C1, C2 formed in the multilayer capacitor array CA2 to regulate the equivalent series resistance such as to make it greater while increasing the capacitance.

Third Embodiment

Figure 5:
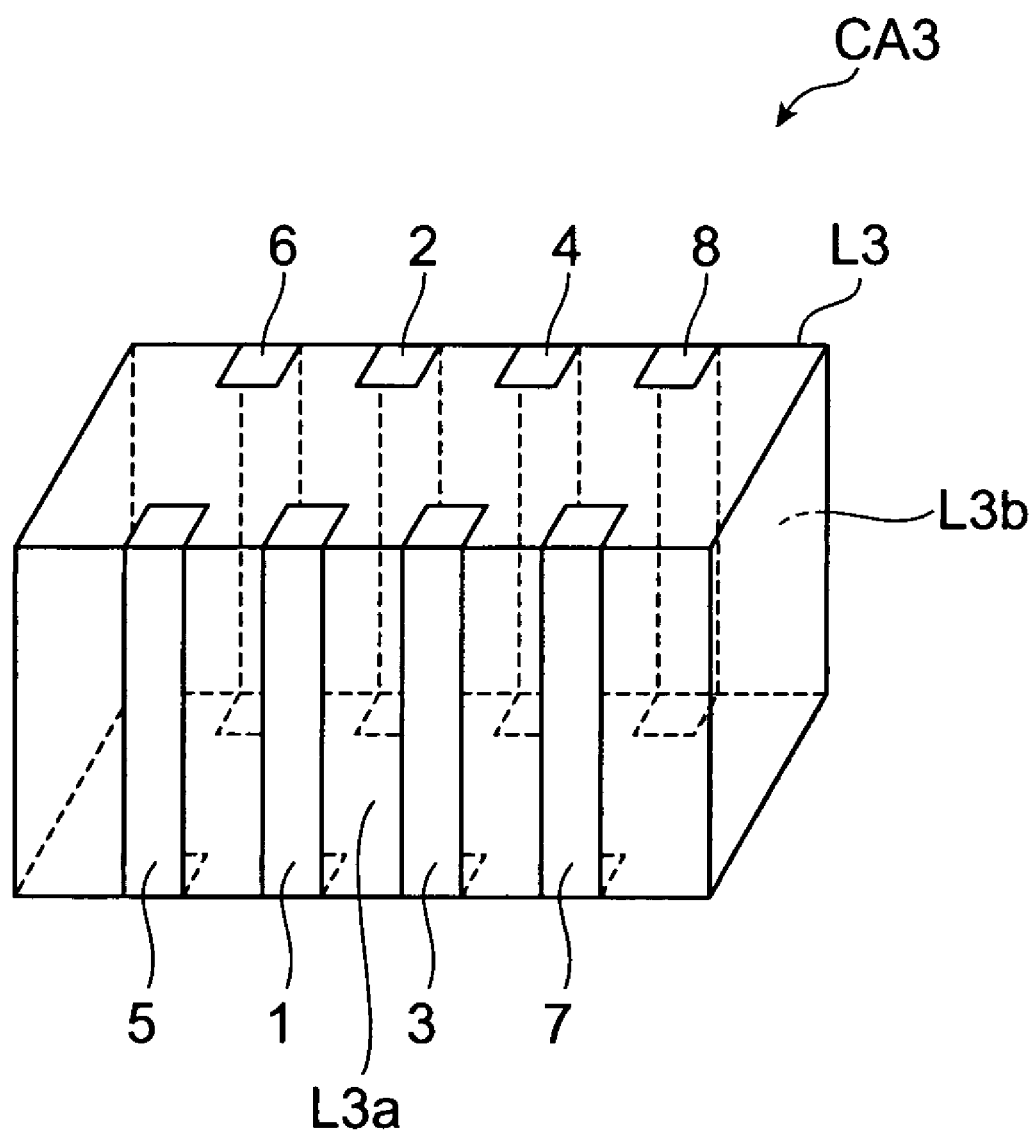
FIG. 5 is a perspective view of the multilayer capacitor array in accordance with a third embodiment.
Figure 6:
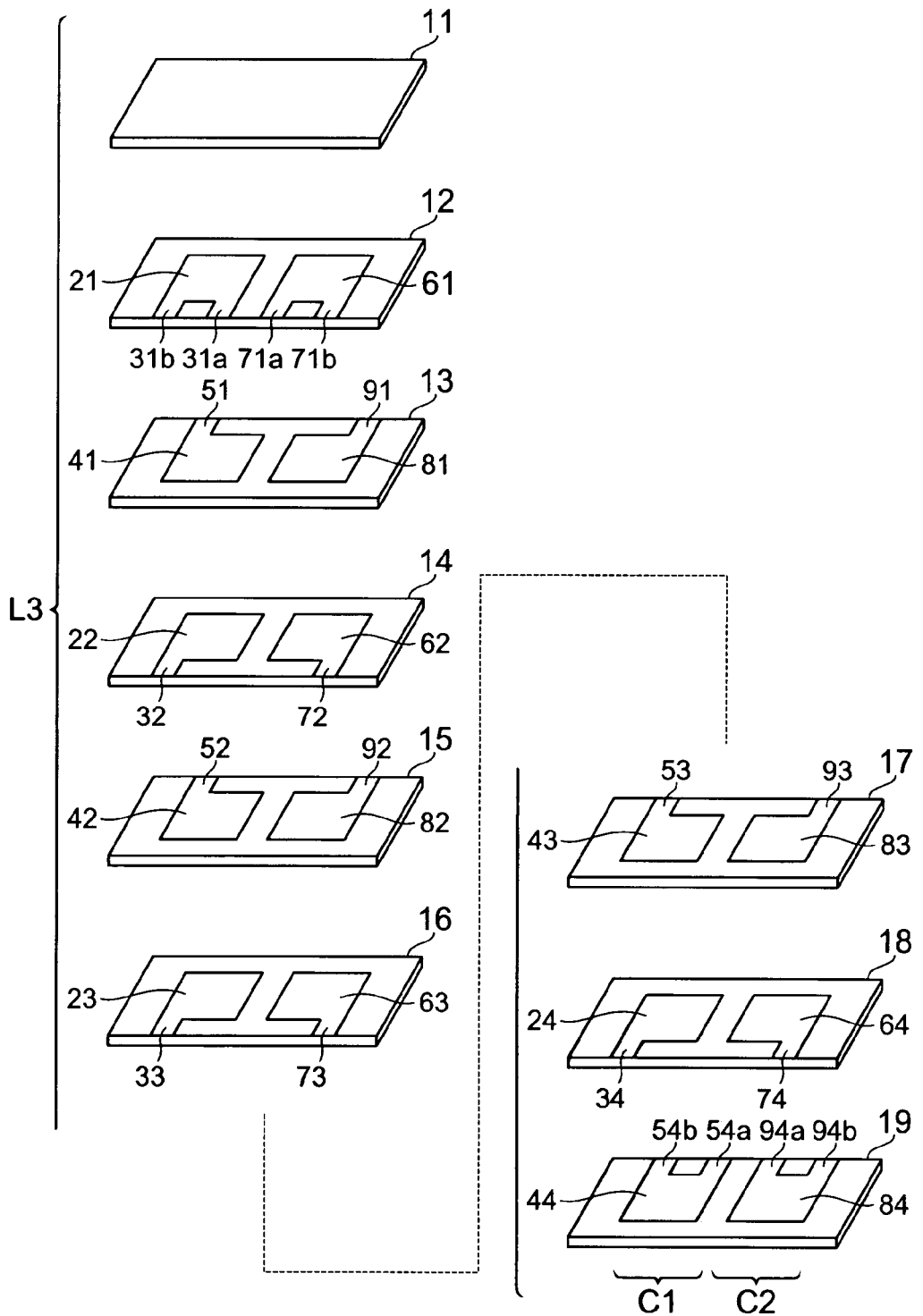
FIG. 6 is an exploded perspective view of the multilayer body included in the multilayer capacitor array in accordance with the third embodiment.

With reference to FIGS. 5 and 6, the structure of multilayer capacitor array CA3 in accordance with a third embodiment will be explained. The multilayer capacitor array CA3 in accordance with the third embodiment differs from the multilayer capacitor array CA1 in accordance with the first embodiment in terms of the arrangement of outer conductors formed on the multilayer body. FIG. 5 is a perspective view of the multilayer capacitor array in accordance with the third embodiment. FIG. 6 is an exploded perspective view of the multilayer body included in the multilayer capacitor array in accordance with the third embodiment.

As shown in FIG. 5, the multilayer capacitor array CA3 in accordance with the third embodiment comprises a multilayer body L3 having a substantially rectangular parallelepiped form, and first to fourth terminal conductors 1 to 4 and first to fourth outer connecting conductors 5 to 8 which are a plurality of outer conductors formed on side faces of the multilayer body L3.

The first and third terminal conductors 1, 3 and first and third outer connecting conductors 5, 7 are positioned on a first side face L3a in the side faces parallel to the laminating direction of the multilayer body L3. The first and third terminal conductors 1, 3 and first and third outer connecting conductors 5, 7 are formed in the order of the first outer connecting conductor 5, first terminal conductor 1, third terminal conductor 3, and third outer connecting conductor 7 from the left side to right side in FIG. 5.

The second and fourth terminal conductors 2, 4 and second and fourth outer connecting conductors 6, 8 are positioned on a second side face L3b opposing the first side face L3a in the side faces parallel to the laminating direction of the multilayer body L3. The second and fourth terminal conductors 2, 4 and second and fourth outer connecting conductors 6, 8 are formed in the order of the second outer connecting conductor 6, second terminal conductor 2, fourth terminal conductor 4, and fourth outer connecting conductor 8 from the left side to right side in FIG. 5.

As shown in FIG. 6, the multilayer body L3 is constructed by laminating a plurality of (9 in this embodiment) dielectric layers 11 to 19. The multilayer body L3 includes a first electrode group having a plurality of (4 each in this embodiment) first and second inner electrodes 21 to 24, 41 to 44 and a second electrode group having a plurality of (4 each in this embodiment) third and fourth inner electrodes 61 to 64, 81 to 84. The first and second electrode groups are arranged in parallel in a direction orthogonal to the laminating direction of the dielectric layers 11 to 19 within the multilayer body L3.

The multilayer capacitor array CA3 includes a first capacitor C1 formed by the plurality of first and second inner electrodes 21 to 24, 41 to 44 and the dielectric layers 12 to 18 held one by one between the plurality of first and second inner electrodes 21 to 24, 41 to 44, and a second capacitor C2 formed by the plurality of third and fourth inner electrodes 61 to 64, 81 to 84 and the dielectric layers 12 to 18 held one by one between the plurality of third and fourth inner electrodes 61 to 64, 81 to 84.

In the multilayer capacitor array CA3, the first and third inner electrodes 21, 61, the first and third inner electrodes 22, 62, the first and third inner electrodes 23, 63, and the first and third inner electrodes 24, 64 are positioned on the same layers in the laminating direction. Also, the second and fourth inner electrodes 41, 81, the second and fourth inner electrodes 42, 82, the second and fourth inner electrodes 43, 83, and the second and fourth inner electrodes 44, 84 are positioned on the same layers in the laminating direction.

The first inner electrode 21 is formed with a lead conductor 31a extending so as to be drawn to the first side face L3a of the multilayer body L3. The first inner electrodes 21 to 24 are formed with respective lead conductors 31b, 32 to 34 extending so as to be drawn to the first side face L3a of the multilayer body L3.

The first inner electrode 21 is electrically connected to the first terminal conductor 1 through the lead conductor 31a. The first inner electrodes 21 to 24 are electrically connected to the first outer connecting conductor 5 through the lead conductors 31b, 32 to 34, respectively. As a result, not only the first inner electrode 21 but also the first inner electrodes 22 to 24 are electrically connected to the first terminal conductor 1 through the first outer connecting conductor 5.

The second inner electrode 44 is formed with a lead conductor 54a extending so as to be drawn to the second side face L3b of the multilayer body L3. The second inner electrodes 41 to 44 are formed with respective lead conductors 51 to 53, 54b extending so as to be drawn to the second side face L3b of the multilayer body L3.

The second inner electrode 44 is electrically connected to the second terminal conductor 2 through the lead conductor 54a. The second inner electrodes 41 to 44 are electrically connected to the second outer connecting conductor 6 through the lead conductors 51 to 53, 54b, respectively. As a result, not only the second inner electrode 44 but also the second inner electrodes 41 to 43 are electrically connected to the second terminal conductor 2 through the second outer connecting conductor 6.

The third inner electrode 61 is formed with a lead conductor 71a extending so as to be drawn to the first side face L3a of the multilayer body L3. The third inner electrodes 61 to 64 are formed with respective lead conductors 71b, 72 to 74 extending so as to be drawn to the first side face L3a of the multilayer body L3.

The third inner electrode 61 is electrically connected to the third terminal conductor 3 through the lead conductor 71a. The third inner electrodes 61 to 64 are electrically connected to the third outer connecting conductor 7 through the lead conductors 71b, 72 to 74, respectively. As a result, not only the third inner electrode 61 but also the third inner electrodes 62 to 64 are electrically connected to the third terminal conductor 3 through the third outer connecting conductor 7.

The fourth inner electrode 84 is formed with a lead conductor 94a extending so as to be drawn to the second side face L3b of the multilayer body L3. The fourth inner electrodes 81 to 84 are formed with respective lead conductors 91 to 93, 94b extending so as to be drawn to the second side face L3b of the multilayer body L3.

The fourth inner electrode 84 is electrically connected to the fourth terminal conductor 4 through the lead conductor 94a. The fourth inner electrodes 81 to 84 are electrically connected to the fourth outer connecting conductor 8 through the lead conductors 91 to 93, 94b, respectively. As a result, not only the fourth inner electrode 84 but also the fourth inner electrodes 81 to 83 are electrically connected to the fourth terminal conductor 4 through the fourth outer connecting conductor 8.

In the first capacitor C1 in the multilayer capacitor array CA3, the first terminal conductor 1 is electrically connected to the first inner electrodes 22 to 24 through the first outer connecting conductor 5 and first inner electrode 21. Also, in the first capacitor C1, the second terminal conductor 2 is electrically connected to the second inner electrodes 41 to 43 through the second outer connecting conductor 6 and second inner electrode 44. These make the first capacitor C1 have an equivalent series resistance greater than that of the conventional capacitor in a multilayer capacitor array in which all the inner electrodes are connected to their corresponding terminal conductors through lead conductors.

In the second capacitor C2 in the multilayer capacitor array CA3, the third terminal conductor 3 is electrically connected to the third inner electrodes 62 to 64 through the third outer connecting conductor 7 and third inner electrode 61. Also, in the second capacitor C2, the fourth terminal conductor 4 is electrically connected to the fourth inner electrodes 81 to 83 through the fourth outer connecting conductor 8 and fourth inner electrode 84. These make the second capacitor C2 have an equivalent series resistance greater than that of the conventional capacitor in a multilayer capacitor array in which all the inner electrodes are connected to their corresponding terminal conductors through lead conductors.

Thus, the multilayer capacitor array CA3 allows each of the first and second capacitors C1, C2 included therein to have an equivalent series resistance greater than that of the conventional capacitor in which all the inner electrodes are connected to their corresponding terminal conductors through lead conductors.

As explained in the foregoing, the multilayer capacitor array CA3 can regulate the equivalent series resistance.

The first capacitor C1 can set the equivalent series resistance to a desirable value by adjusting the number or position in the laminating direction of at least one species of first inner electrode 21 and second inner electrode 44. The second capacitor C2 can set the equivalent series resistance to a desirable value by adjusting the number or position in the laminating direction of at least one species of third inner electrode 61 and fourth inner electrode 84. Consequently, the multilayer capacitor array CA3 can regulate the equivalent series resistance easily and accurately.

In the multilayer capacitor array CA3, the plurality of first and second inner electrodes 21 to 24, 41 to 44 are positioned so as to oppose each other, with one of the dielectric layers 12 to 18 in between each pair. On the other hand, the plurality of third and fourth inner electrodes 61 to 64, 81 to 84 are positioned so as to oppose each other, with one of the dielectric layers 12 to 18 in between each pair. These allow the capacitors C1, C2 formed in the multilayer capacitor array CA3 to regulate the equivalent series resistance such as to make it greater while increasing the capacitance.

Fourth Embodiment

Figure 7:
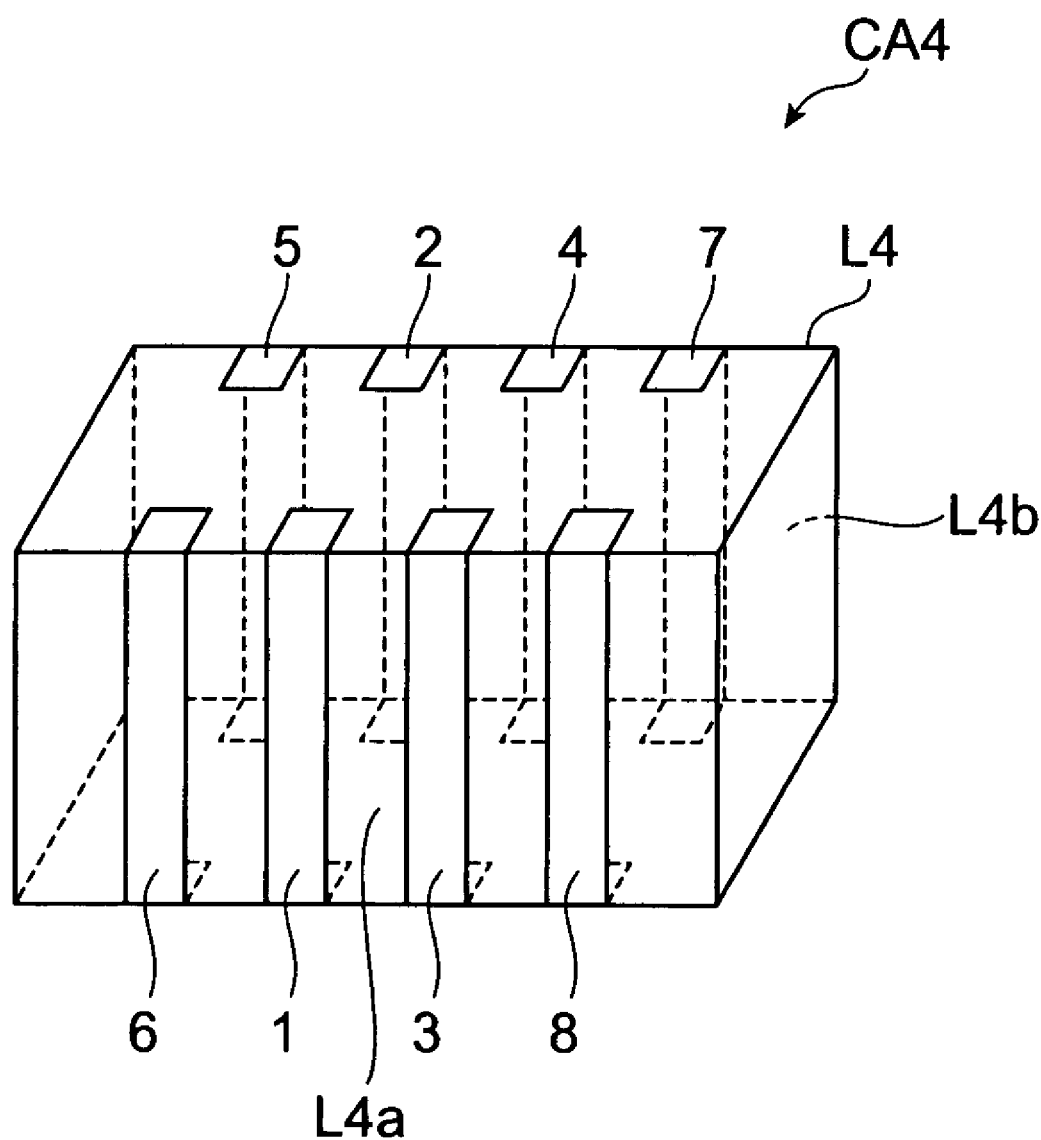
FIG. 7 is a perspective view of the multilayer capacitor array in accordance with a fourth embodiment.
Figure 8:
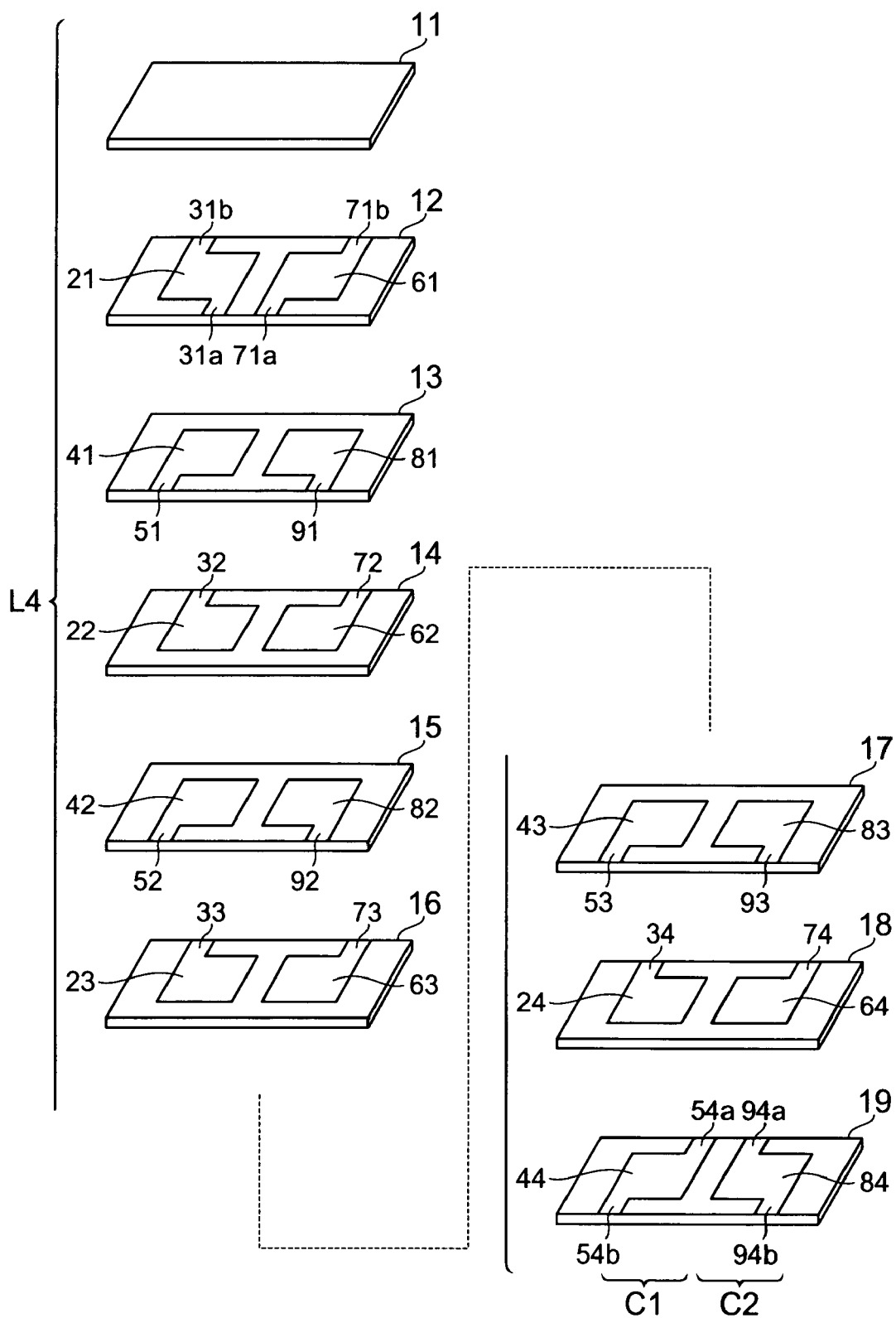
FIG. 8 is an exploded perspective view of the multilayer body included in the multilayer capacitor array in accordance with the fourth embodiment.

With reference to FIGS. 7 and 8, the structure of multilayer capacitor array CA4 in accordance with a fourth embodiment will be explained. The multilayer capacitor array CA4 in accordance with the fourth embodiment differs from the multilayer capacitor array CA1 in accordance with the first embodiment in terms of the arrangement of outer conductors formed on the multilayer body. FIG. 7 is a perspective view of the multilayer capacitor array in accordance with the fourth embodiment. FIG. 8 is an exploded perspective view of the multilayer body included in the multilayer capacitor array in accordance with the fourth embodiment.

As shown in FIG. 7, the multilayer capacitor array CA4 in accordance with the fourth embodiment comprises a multilayer body L4 having a substantially rectangular parallelepiped form, and first to fourth terminal conductors 1 to 4 and first to fourth outer connecting conductors 5 to 8 which are a plurality of outer conductors formed on side faces of the multilayer body L4.

The first and third terminal conductors 1, 3 and second and fourth outer connecting conductors 6, 8 are positioned on a first side face L4a in the side faces parallel to the laminating direction of the multilayer body L4. The first and third terminal conductors 1, 3 and second and fourth outer connecting conductors 6, 8 are formed in the order of the second outer connecting conductor 6, first terminal conductor 1, third terminal conductor 3, and fourth outer connecting conductor 8 from the left side to right side in FIG. 7.

The second and fourth terminal conductors 2, 4 and first and third outer connecting conductors 5, 7 are positioned on a second side face L4b opposing the first side face L4a in the side faces parallel to the laminating direction of the multilayer body L4. The second and fourth terminal conductors 2, 4 and first and third outer connecting conductors 5, 7 are formed in the order of the first outer connecting conductor 5, second terminal conductor 2, fourth terminal conductor 4, and third outer connecting conductor 7 from the left side to right side in FIG. 7.

As shown in FIG. 8, the multilayer body L4 is constructed by laminating a plurality of (9 in this embodiment) dielectric layers 11 to 19. The multilayer body L4 includes a first electrode group having a plurality of (4 each in this embodiment) first and second inner electrodes 21 to 24, 41 to 44 and a second electrode group having a plurality of (4 each in this embodiment) third and fourth inner electrodes 61 to 64, 81 to 84. The first and second electrode groups are arranged in parallel in a direction orthogonal to the laminating direction of the dielectric layers 11 to 19 within the multilayer body L4.

The multilayer capacitor array CA4 includes a first capacitor C1 formed by the plurality of first and second inner electrodes 21 to 24, 41 to 44 and the dielectric layers 12 to 18 held one by one between the plurality of first and second inner electrodes 21 to 24, 41 to 44, and a second capacitor C2 formed by the plurality of third and fourth inner electrodes 61 to 64, 81 to 84 and the dielectric layers 12 to 18 held one by one between the plurality of third and fourth inner electrodes 61 to 64, 81 to 84.

In the multilayer capacitor array CA4, the first and third inner electrodes 21, 61, the first and third inner electrodes 22, 62, the first and third inner electrodes 23, 63, and the first and third inner electrodes 24, 64 are positioned on the same layers in the laminating direction. Also, the second and fourth inner electrodes 41, 81, the second and fourth inner electrodes 42, 82, the second and fourth inner electrodes 43, 83, and the second and fourth inner electrodes 44, 84 are positioned on the same layers in the laminating direction.

The first inner electrode 21 is formed with a lead conductor 31a extending so as to be drawn to the first side face L4a of the multilayer body L4. The first inner electrodes 21 to 24 are formed with respective lead conductors 31b, 32 to 34 extending so as to be drawn to the second side face L4b of the multilayer body L4.

The first inner electrode 21 is electrically connected to the first terminal conductor 1 through the lead conductor 31a. The first inner electrodes 21 to 24 are electrically connected to the first outer connecting conductor 5 through the lead conductors 31b, 32 to 34, respectively. As a result, not only the first inner electrode 21 but also the first inner electrodes 22 to 24 are electrically connected to the first terminal conductor 1 through the first outer connecting conductor 5.

The second inner electrode 44 is formed with a lead conductor 54a extending so as to be drawn to the second side face L4b of the multilayer body L4. The second inner electrodes 41 to 44 are formed with respective lead conductors 51 to 53, 54b extending so as to be drawn to the first side face L4a of the multilayer body L4.

The second inner electrode 44 is electrically connected to the second terminal conductor 2 through the lead conductor 54a. The second inner electrodes 41 to 44 are electrically connected to the second outer connecting conductor 6 through the lead conductors 51 to 53, 54b, respectively. As a result, not only the second inner electrode 44 but also the second inner electrodes 41 to 43 are electrically connected to the second terminal conductor 2 through the second outer connecting conductor 6.

The third inner electrode 61 is formed with a lead conductor 71a extending so as to be drawn to the first side face L4a of the multilayer body L4. The third inner electrodes 61 to 64 are formed with respective lead conductors 71b, 72 to 74 extending so as to be drawn to the second side face L4b of the multilayer body L4.

The third inner electrode 61 is electrically connected to the third terminal conductor 3 through the lead conductor 71a. The third inner electrodes 61 to 64 are electrically connected to the third outer connecting conductor 7 through the lead conductors 71b, 72 to 74, respectively. As a result, not only the third inner electrode 61 but also the third inner electrodes 62 to 64 are electrically connected to the third terminal conductor 3 through the third outer connecting conductor 7.

The fourth inner electrode 84 is formed with a lead conductor 94a extending so as to be drawn to the second side face L4b of the multilayer body L4. The fourth inner electrodes 81 to 84 are formed with respective lead conductors 91 to 93, 94b extending so as to be drawn to the first side face L4a of the multilayer body L4.

The fourth inner electrode 84 is electrically connected to the fourth terminal conductor 4 through the lead conductor 94a. The fourth inner electrodes 81 to 84 are electrically connected to the fourth outer connecting conductor 8 through the lead conductors 91 to 93, 94b, respectively. As a result, not only the fourth inner electrode 84 but also the fourth inner electrodes 81 to 83 are electrically connected to the fourth terminal conductor 4 through the fourth outer connecting conductor 8.

In the first capacitor C1 in the multilayer capacitor array CA4, the first terminal conductor 1 is electrically connected to the first inner electrodes 22 to 24 through the first outer connecting conductor 5 and first inner electrode 21. Also, in the first capacitor C1, the second terminal conductor 2 is electrically connected to the second inner electrodes 41 to 43 through the second outer connecting conductor 6 and second inner electrode 44. These make the first capacitor C1 have an equivalent series resistance greater than that of the conventional capacitor in a multilayer capacitor array in which all the inner electrodes are connected to their corresponding terminal conductors through lead conductors.

In the second capacitor C2 in the multilayer capacitor array CA4, the third terminal conductor 3 is electrically connected to the third inner electrodes 62 to 64 through the third outer connecting conductor 7 and third inner electrode 61. Also, in the second capacitor C2, the fourth terminal conductor 4 is electrically connected to the fourth inner electrodes 81 to 83 through the fourth outer connecting conductor 8 and fourth inner electrode 84. These make the second capacitor C2 have an equivalent series resistance greater than that of the conventional capacitor in a multilayer capacitor array in which all the inner electrodes are connected to their corresponding terminal conductors through lead conductors.

Thus, the multilayer capacitor array CA4 allows each of the first and second capacitors C1, C2 included therein to have an equivalent series resistance greater than that of the conventional capacitor in which all the inner electrodes are connected to their corresponding terminal conductors through lead conductors.

As explained in the foregoing, the multilayer capacitor array CA4 can regulate the equivalent series resistance.

The first capacitor C1 can set the equivalent series resistance to a desirable value by adjusting the number or position in the laminating direction of at least one species of first inner electrode 21 and second inner electrode 44. The second capacitor C2 can set the equivalent series resistance to a desirable value by adjusting the number or position in the laminating direction of at least one species of third inner electrode 61 and fourth inner electrode 84. Consequently, the multilayer capacitor array CA4 can regulate the equivalent series resistance easily and accurately.

In the multilayer capacitor array CA4, the plurality of first and second inner electrodes 21 to 24, 41 to 44 are positioned so as to oppose each other, with one of the dielectric layers 12 to 18 in between each pair. On the other hand, the plurality of third and fourth inner electrodes 61 to 64, 81 to 84 are positioned so as to oppose each other, with one of the dielectric layers 12 to 18 in between each pair. These allow the capacitors C1, C2 formed in the multilayer capacitor array CA4 to regulate the equivalent series resistance such as to make it greater while increasing the capacitance.

Fifth Embodiment

Figure 9:
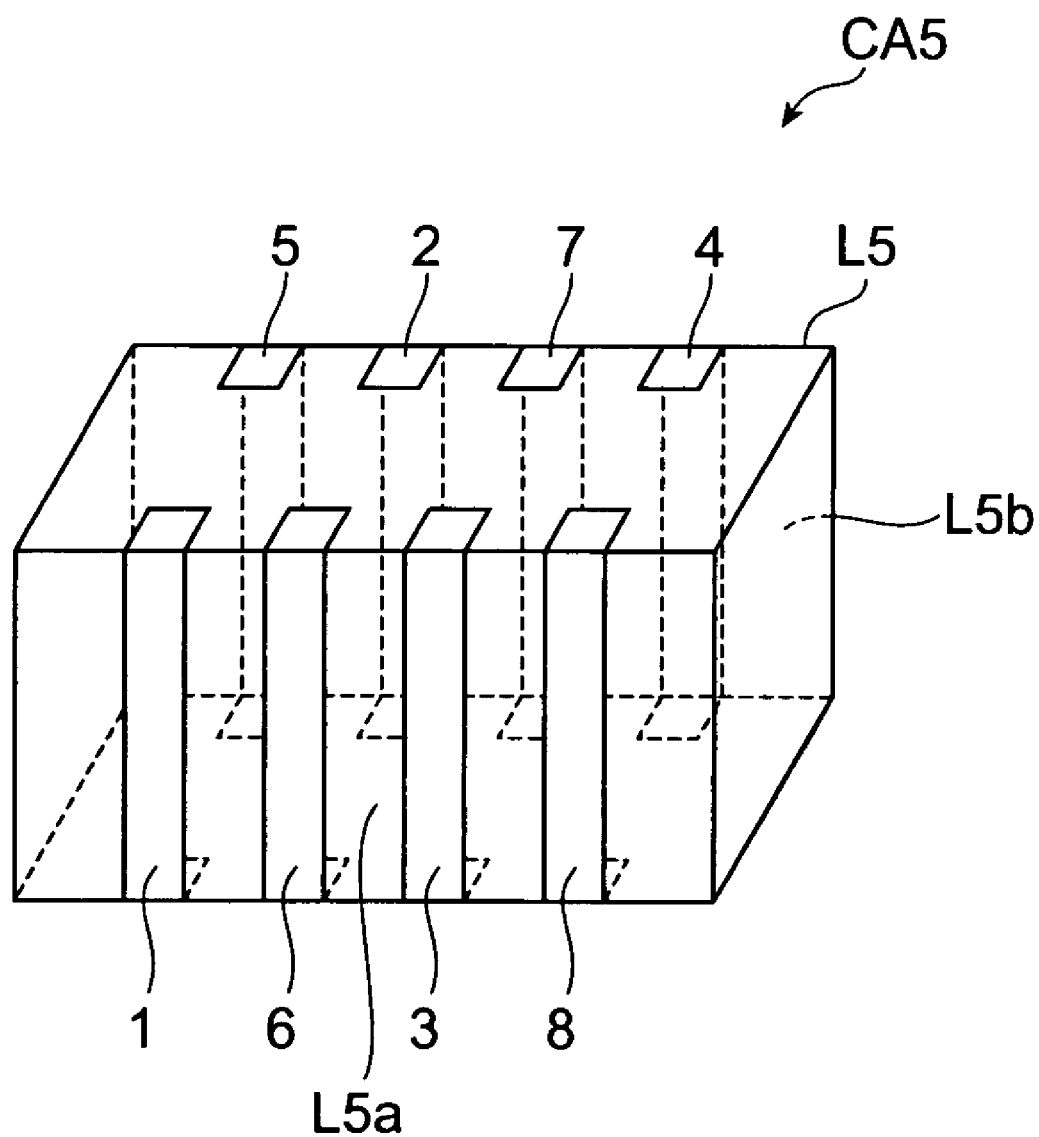
FIG. 9 is a perspective view of the multilayer capacitor array in accordance with a fifth embodiment.
Figure 10:
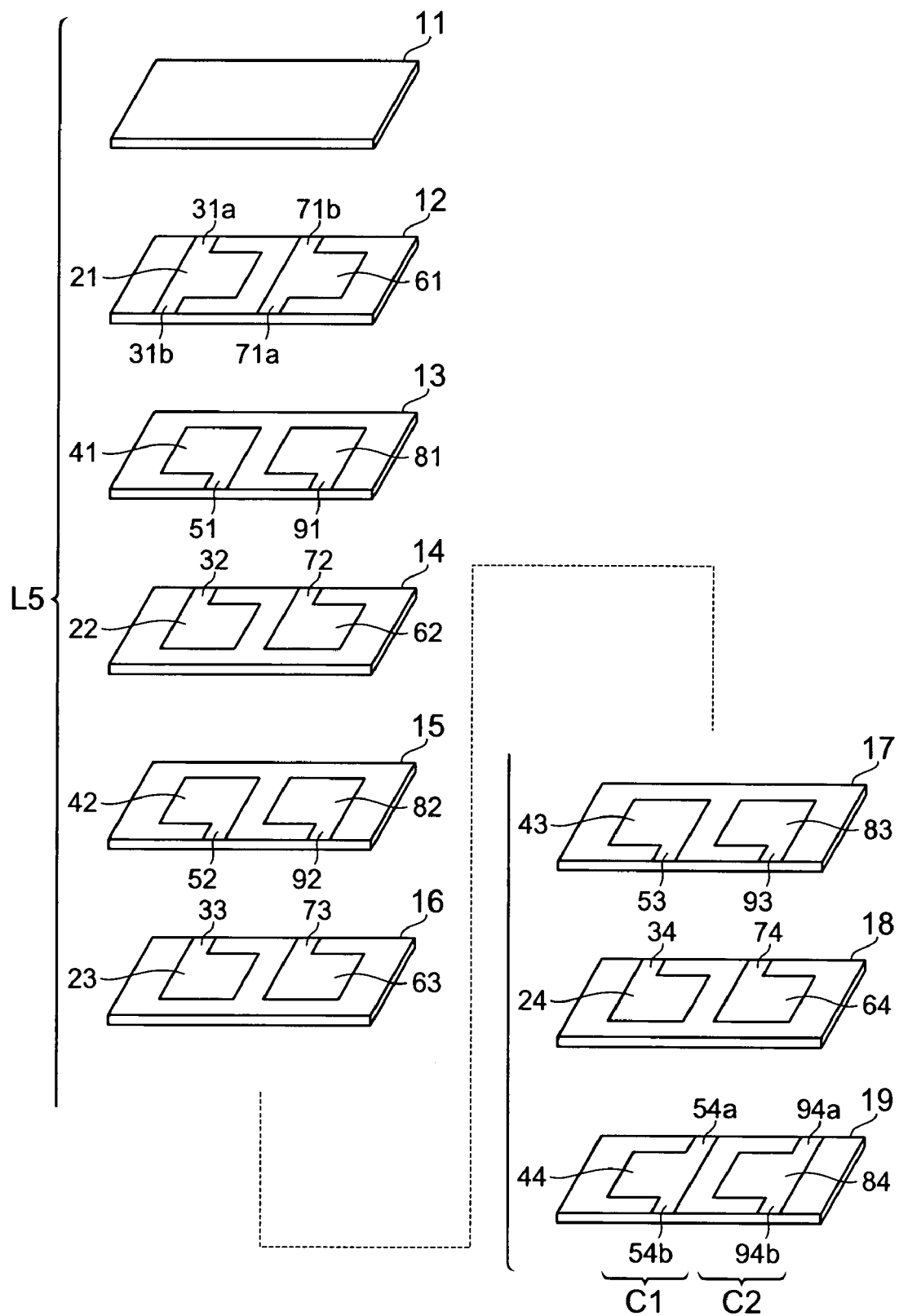
FIG. 10 is an exploded perspective view of the multilayer body included in the multilayer capacitor array in accordance with the fifth embodiment.

With reference to FIGS. 9 and 10, the structure of multilayer capacitor array CA5 in accordance with a fifth embodiment will be explained. The multilayer capacitor array CA5 in accordance with the fifth embodiment differs from the multilayer capacitor array CA1 in accordance with the first embodiment in terms of the arrangement of outer conductors formed on the multilayer body. FIG. 9 is a perspective view of the multilayer capacitor array in accordance with the fifth embodiment. FIG. 10 is an exploded perspective view of the multilayer body included in the multilayer capacitor array in accordance with the fifth embodiment.

As shown in FIG. 9, the multilayer capacitor array CA5 in accordance with the fifth embodiment comprises a multilayer body L5 having a substantially rectangular parallelepiped form, and first to fourth terminal conductors 1 to 4 and first to fourth outer connecting conductors 5 to 8 which are a plurality of outer conductors formed on side faces of the multilayer body L5.

The first and third terminal conductors 1, 3 and second and fourth outer connecting conductors 6, 8 are positioned on a first side face L5a in the side faces parallel to the laminating direction of the multilayer body L5. The first and third terminal conductors 1, 3 and second and fourth outer connecting conductors 6, 8 are formed in the order of the first terminal conductor 1, second outer connecting conductor 6, third terminal conductor 3, and fourth outer connecting conductor 8 from the left side to right side in FIG. 9.

The second and fourth terminal conductors 2, 4 and first and third outer connecting conductors 5, 7 are positioned on a second side face L5b opposing the first side face L5a in the side faces parallel to the laminating direction of the multilayer body L5. The second and fourth terminal conductors 2, 4 and first and third outer connecting conductors 5, 7 are formed in the order of the first outer connecting conductor 5, second terminal conductor 2, third outer connecting conductor 7, and fourth terminal conductor 4 from the left side to right side in FIG. 9.

As shown in FIG. 10, the multilayer body L5 is constructed by laminating a plurality of (9 in this embodiment) dielectric layers 11 to 19. The multilayer body L5 includes a first electrode group having a plurality of (4 each in this embodiment) first and second inner electrodes 21 to 24, 41 to 44 and a second electrode group having a plurality of (4 each in this embodiment) third and fourth inner electrodes 61 to 64, 81 to 84. The first and second electrode groups are arranged in parallel in a direction orthogonal to the laminating direction of the dielectric layers 11 to 19 within the multilayer body L5.

The multilayer capacitor array CA5 includes a first capacitor C1 formed by the plurality of first and second inner electrodes 21 to 24, 41 to 44 and the dielectric layers 12 to 18 held one by one between the plurality of first and second inner electrodes 21 to 24, 41 to 44, and a second capacitor C2 formed by the plurality of third and fourth inner electrodes 61 to 64, 81 to 84 and the dielectric layers 12 to 18 held one by one between the plurality of third and fourth inner electrodes 61 to 64, 81 to 84.

In the multilayer capacitor array CA5, the first and third inner electrodes 21, 61, the first and third inner electrodes 22, 62, the first and third inner electrodes 23, 63, and the first and third inner electrodes 24, 64 are positioned on the same layers in the laminating direction. Also, the second and fourth inner electrodes 41, 81, the second and fourth inner electrodes 42, 82, the second and fourth inner electrodes 43, 83, and the second and fourth inner electrodes 44, 84 are positioned on the same layers in the laminating direction.

The first inner electrode 21 is formed with a lead conductor 31a extending so as to be drawn to the first side face L5a of the multilayer body L5. The first inner electrodes 21 to 24 are formed with respective lead conductors 31b, 32 to 34 extending so as to be drawn to the second side face L5b of the multilayer body L5.

The first inner electrode 21 is electrically connected to the first terminal conductor 1 through the lead conductor 31a. The first inner electrodes 21 to 24 are electrically connected to the first outer connecting conductor 5 through the lead conductors 31b, 32 to 34, respectively. As a result, not only the first inner electrode 21 but also the first inner electrodes 22 to 24 are electrically connected to the first terminal conductor 1 through the first outer connecting conductor 5.

The second inner electrode 44 is formed with a lead conductor 54a extending so as to be drawn to the second side face L5b of the multilayer body L5. The second inner electrodes 41 to 44 are formed with respective lead conductors 51 to 53, 54b extending so as to be drawn to the first side face L5a of the multilayer body L5.

The second inner electrode 44 is electrically connected to the second terminal conductor 2 through the lead conductor 54a. The second inner electrodes 41 to 44 are electrically connected to the second outer connecting conductor 6 through the lead conductors 51 to 53, 54b, respectively. As a result, not only the second inner electrode 44 but also the second inner electrodes 41 to 43 are electrically connected to the second terminal conductor 2 through the second outer connecting conductor 6.

The third inner electrode 61 is formed with a lead conductor 71a extending so as to be drawn to the first side face L5a of the multilayer body L5. The third inner electrodes 61 to 64 are formed with respective lead conductors 71b, 72 to 74 extending so as to be drawn to the second side face L5b of the multilayer body L5.

The third inner electrode 61 is electrically connected to the third terminal conductor 3 through the lead conductor 71a. The third inner electrodes 61 to 64 are electrically connected to the third outer connecting conductor 7 through the lead conductors 71b, 72 to 74, respectively. As a result, not only the third inner electrode 61 but also the third inner electrodes 62 to 64 are electrically connected to the third terminal conductor 3 through the third outer connecting conductor 7.

The fourth inner electrode 84 is formed with a lead conductor 94a extending so as to be drawn to the second side face L5b of the multilayer body L5. The fourth inner electrodes 81 to 84 are formed with respective lead conductors 91 to 93, 94b extending so as to be drawn to the first side face L5a of the multilayer body L5.

The fourth inner electrode 84 is electrically connected to the fourth terminal conductor 4 through the lead conductor 94a. The fourth inner electrodes 81 to 84 are electrically connected to the fourth outer connecting conductor 8 through the lead conductors 91 to 93, 94b, respectively. As a result, not only the fourth inner electrode 84 but also the fourth inner electrodes 81 to 83 are electrically connected to the fourth terminal conductor 4 through the fourth outer connecting conductor 8.

In the first capacitor C1 in the multilayer capacitor array CA5, the first terminal conductor 1 is electrically connected to the first inner electrodes 22 to 24 through the first outer connecting conductor 5 and first inner electrode 21. Also, in the first capacitor C1, the second terminal conductor 2 is electrically connected to the second inner electrodes 41 to 43 through the second outer connecting conductor 6 and second inner electrode 44. These make the first capacitor C1 have an equivalent series resistance greater than that of the conventional capacitor in a multilayer capacitor array in which all the inner electrodes are connected to their corresponding terminal conductors through lead conductors.

In the second capacitor C2 in the multilayer capacitor array CA5, the third terminal conductor 3 is electrically connected to the third inner electrodes 62 to 64 through the third outer connecting conductor 7 and third inner electrode 61. Also, in the second capacitor C2, the fourth terminal conductor 4 is electrically connected to the fourth inner electrodes 81 to 83 through the fourth outer connecting conductor 8 and fourth inner electrode 84. These make the second capacitor C2 have an equivalent series resistance greater than that of the conventional capacitor in a multilayer capacitor array in which all the inner electrodes are connected to their corresponding terminal conductors through lead conductors.

Thus, the multilayer capacitor array CA5 allows each of the first and second capacitors C1, C2 included therein to have an equivalent series resistance greater than that of the conventional capacitor in which all the inner electrodes are connected to their corresponding terminal conductors through lead conductors.

As explained in the foregoing, the multilayer capacitor array CA5 can regulate the equivalent series resistance.

The first capacitor C1 can set the equivalent series resistance to a desirable value by adjusting the number or position in the laminating direction of at least one species of first inner electrode 21 and second inner electrode 44. The second capacitor C2 can set the equivalent series resistance to a desirable value by adjusting the number or position in the laminating direction of at least one species of third inner electrode 61 and fourth inner electrode 84. Consequently, the multilayer capacitor array CA5 can regulate the equivalent series resistance easily and accurately.

In the multilayer capacitor array CA5, the plurality of first and second inner electrodes 21 to 24, 41 to 44 are positioned so as to oppose each other, with one of the dielectric layers 12 to 18 in between each pair. On the other hand, the plurality of third and fourth inner electrodes 61 to 64, 81 to 84 are positioned so as to oppose each other, with one of the dielectric layers 12 to 18 in between each pair. These allow the capacitors C1, C2 formed in the multilayer capacitor array CA5 to regulate the equivalent series resistance such as to make it greater while increasing the capacitance.

Sixth Embodiment

Figure 11:
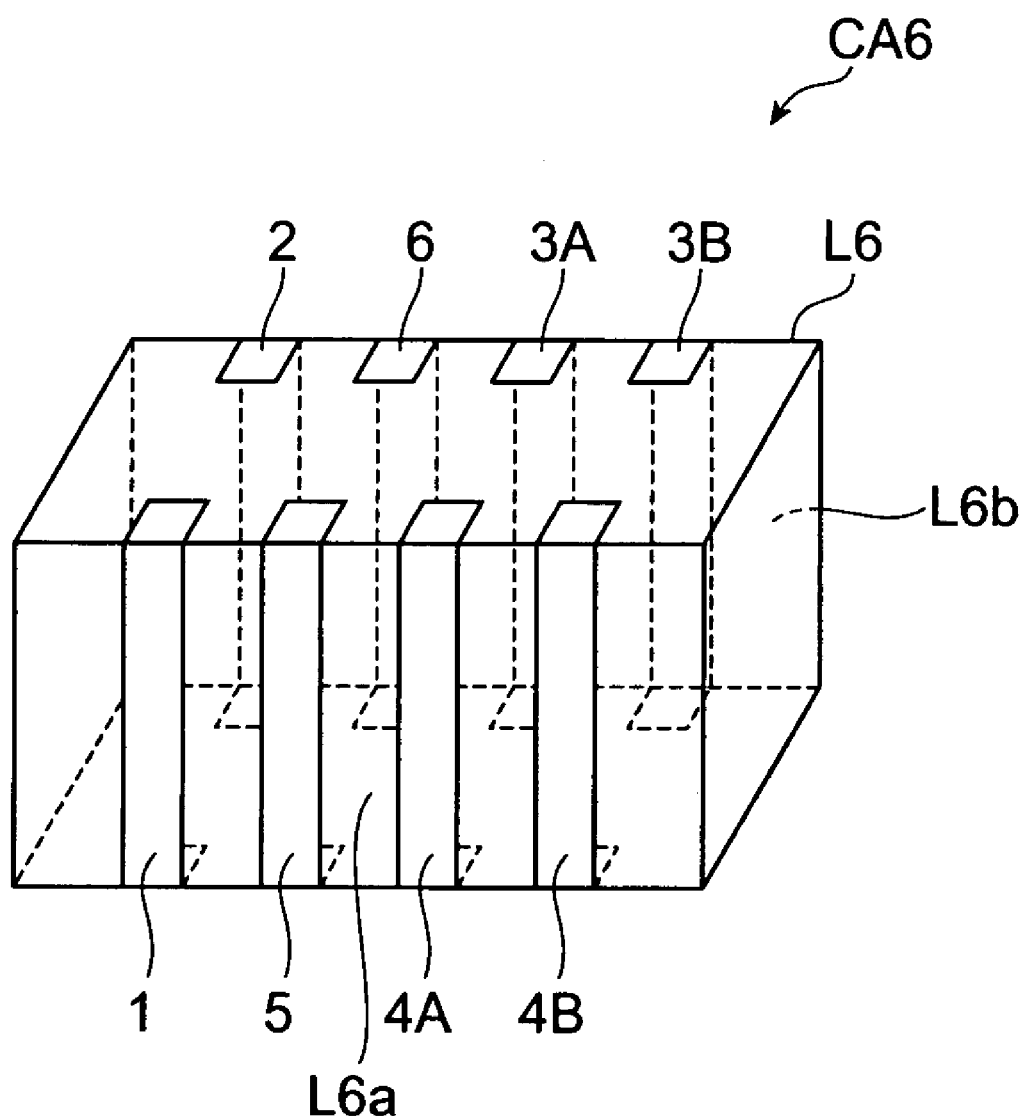
FIG. 11 is a perspective view of the multilayer capacitor array in accordance with a sixth embodiment.
Figure 12:
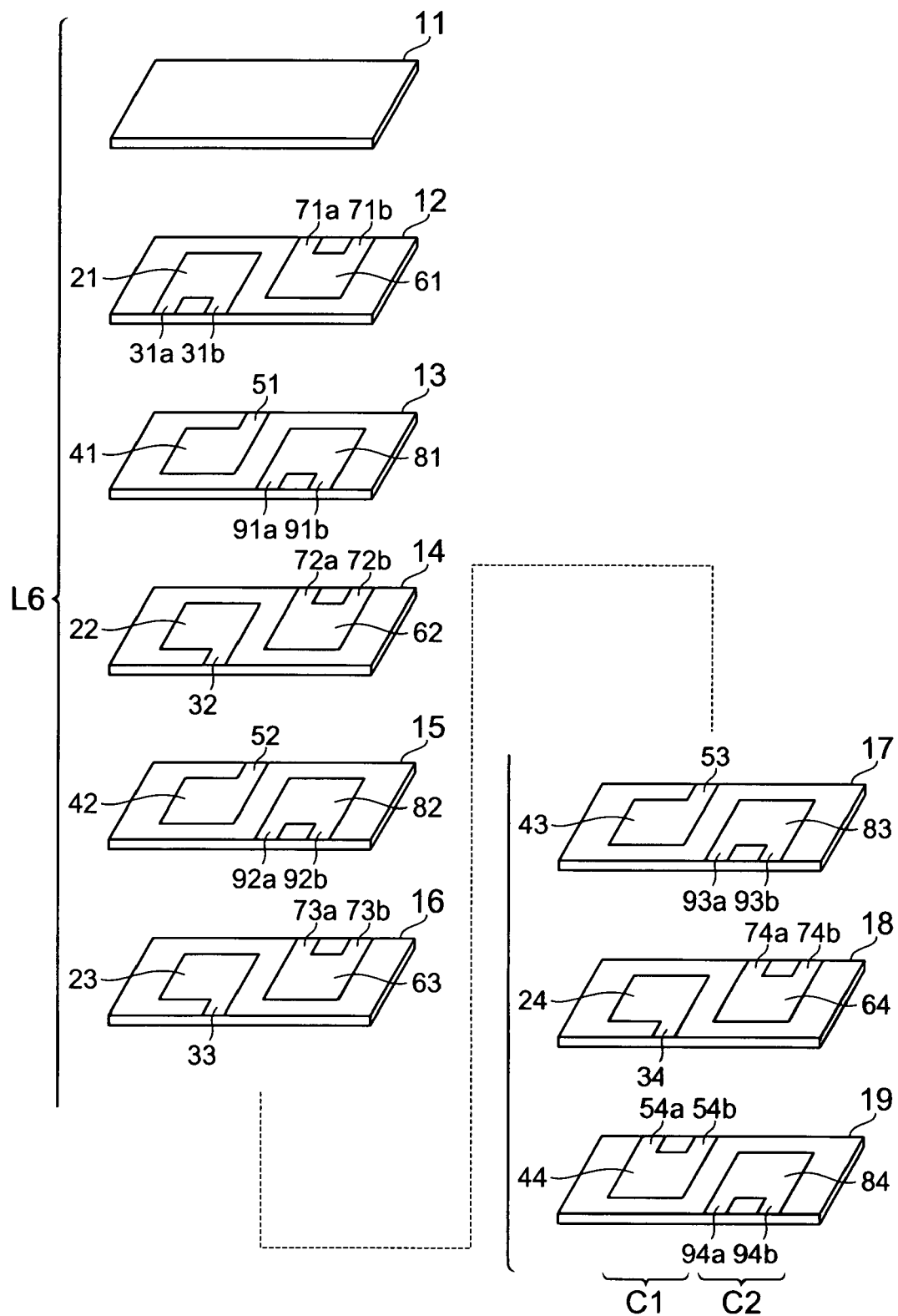
FIG. 12 is an exploded perspective view of the multilayer body included in the multilayer capacitor array in accordance with the sixth embodiment.

With reference to FIGS. 11 and 12, the structure of multilayer capacitor array CA6 in accordance with a sixth embodiment will be explained. The multilayer capacitor array CA6 in accordance with the sixth embodiment differs from the multilayer capacitor array CA1 in accordance with the first embodiment in terms of the arrangement of outer conductors formed on the multilayer body. FIG. 11 is a perspective view of the multilayer capacitor array in accordance with the sixth embodiment. FIG. 12 is an exploded perspective view of the multilayer body included in the multilayer capacitor array in accordance with the sixth embodiment.

As shown in FIG. 11, the multilayer capacitor array CA6 in accordance with the sixth embodiment comprises a multilayer body L6 having a substantially rectangular parallelepiped form, and first to fourth terminal conductors 1, 2, 3A, 3B, 4A, 4B and first and second outer connecting conductors 5, 6 which are a plurality of outer conductors formed on side faces of the multilayer body L6.

The first and fourth terminal conductors 1, 4A, 4B and first outer connecting conductor 5 are positioned on a first side face L6a in the side faces parallel to the laminating direction of the multilayer body L6. The first and fourth terminal conductors 1, 4A, 4B and first outer connecting conductor 5 are formed in the order of the first terminal conductor 1, first outer connecting conductor 5, fourth terminal conductor 4A, and fourth terminal conductor 4B from the left side to right side in FIG. 11.

The second and third terminal conductors 2, 3A, 3B and second outer connecting conductor 6 are positioned on a second side face L6b opposing the first side face L6a in the side faces parallel to the laminating direction of the multilayer body L6. The second and third terminal conductors 2, 3A, 3B and second outer connecting conductor 6 are formed in the order of the second terminal conductor 2, second outer connecting conductor 6, third terminal conductor 3A, and third terminal conductor 3B from the left side to right side in FIG. 11.

As shown in FIG. 12, the multilayer body L6 is constructed by laminating a plurality of (9 in this embodiment) dielectric layers 11 to 19. The multilayer body L6 includes a first electrode group having a plurality of (4 each in this embodiment) first and second inner electrodes 21 to 24, 41 to 44 and a second electrode group having a plurality of (4 each in this embodiment) third and fourth inner electrodes 61 to 64, 81 to 84. The first and second electrode groups are arranged in parallel in a direction orthogonal to the laminating direction of the dielectric layers 11 to 19 within the multilayer body L6.

The multilayer capacitor array CA6 includes a first capacitor C1 formed by the plurality of first and second inner electrodes 21 to 24, 41 to 44 and the dielectric layers 12 to 18 held one by one between the plurality of first and second inner electrodes 21 to 24, 41 to 44, and a second capacitor C2 formed by the plurality of third and fourth inner electrodes 61 to 64, 81 to 84 and the dielectric layers 12 to 18 held one by one between the plurality of third and fourth inner electrodes 61 to 64, 81 to 84.

In the multilayer capacitor array CA6, the first and third inner electrodes 21, 61, the first and third inner electrodes 22, 62, the first and third inner electrodes 23, 63, and the first and third inner electrodes 24, 64 are positioned on the same layers in the laminating direction. Also, the second and fourth inner electrodes 41, 81, the second and fourth inner electrodes 42, 82, the second and fourth inner electrodes 43, 83, and the second and fourth inner electrodes 44, 84 are positioned on the same layers in the laminating direction.

The first inner electrode 21 is formed with a lead conductor 31a extending so as to be drawn to the first side face L6a of the multilayer body L6. The first inner electrodes 21 to 24 are formed with respective lead conductors 31b, 32 to 34 extending so as to be drawn to the first side face 6a of the multilayer body L6.

The first inner electrode 21 is electrically connected to the first terminal conductor 1 through the lead conductor 31a. The first inner electrodes 21 to 24 are electrically connected to the first outer connecting conductor 5 through the lead conductors 31b, 32 to 34, respectively. As a result, not only the first inner electrode 21 but also the first inner electrodes 22 to 24 are electrically connected to the first terminal conductor 1 through the first outer connecting conductor 5.

The second inner electrode 44 is formed with a lead conductor 54a extending so as to be drawn to the second side face L6b of the multilayer body L6. The second inner electrodes 41 to 44 are formed with respective lead conductors 51 to 53, 54b extending so as to be drawn to the second side face L6b of the multilayer body L6.

The second inner electrode 44 is electrically connected to the second terminal conductor 2 through the lead conductor 54a. The second inner electrodes 41 to 44 are electrically connected to the second outer connecting conductor 6 through the lead conductors 51 to 53, 54b, respectively. As a result, not only the second inner electrode 44 but also the second inner electrodes 41 to 43 are electrically connected to the second terminal conductor 2 through the second outer connecting conductor 6.

The third inner electrodes 61 to 64 are formed with respective pairs of lead conductors 71a to 74a, 71b to 74b extending so as to be drawn to the second side face L6b of the multilayer body L6.

The third inner electrodes 61 to 64 are electrically connected to the third terminal conductor 3A through their corresponding lead conductors 71a to 74a. The third inner electrodes 61 to 64 are electrically connected to the third terminal conductor 3B through their corresponding lead conductors 71b to 74b.

The fourth inner electrodes 81 to 84 are formed with respective pairs of lead conductors 91a to 94a, 91b to 94b extending so as to be drawn to the first side face L6a of the multilayer body L6.

The fourth inner electrodes 81 to 84 are electrically connected to the fourth terminal conductor 4A through their corresponding lead conductors 91a to 94a. The fourth inner electrodes 81 to 84 are electrically connected to the fourth terminal conductor 4B through their corresponding lead conductors 91b to 94b.

In the first capacitor C1 in the multilayer capacitor array CA6, the first terminal conductor 1 is electrically connected to the first inner electrodes 22 to 24 through the first outer connecting conductor 5 and first inner electrode 21. Also, in the first capacitor C1, the second terminal conductor 2 is electrically connected to the second inner electrodes 41 to 43 through the second outer connecting conductor 6 and second inner electrode 44. These make the first capacitor C1 have an equivalent series resistance greater than that of the conventional capacitor in a multilayer capacitor array in which all the inner electrodes are connected to their corresponding terminal conductors through lead conductors.

In the multilayer capacitor array CA6, the first capacitor C1 included therein has an equivalent series resistance greater than that of the conventional capacitor in which all the inner electrodes are connected to their corresponding terminal conductors through lead conductors, while all the inner electrodes in the second capacitor C2 are connected to their corresponding terminal conductors through lead conductors. Therefore, the multilayer capacitor array CA6 can include the first capacitor C1 having a large equivalent series resistance and the second capacitor C2 that is not set such as to increase its equivalent series resistance.

As explained in the foregoing, the multilayer capacitor array CA6 can regulate the equivalent series resistance.

The first capacitor C1 can set the equivalent series resistance to a desirable value by adjusting the number or position in the laminating direction of at least one species of first inner electrode 21 and second inner electrode 44. Consequently, the multilayer capacitor array CA6 can regulate the equivalent series resistance easily and accurately.

In the multilayer capacitor array CA6, the plurality of first and second inner electrodes 21 to 24, 41 to 44 are positioned so as to oppose each other, with one of the dielectric layers 12 to 18 in between each pair. This allows the capacitor C1 formed in the multilayer capacitor array CA6 to regulate the equivalent series resistance such as to make it greater while increasing the capacitance.

Seventh Embodiment

Figure 13:
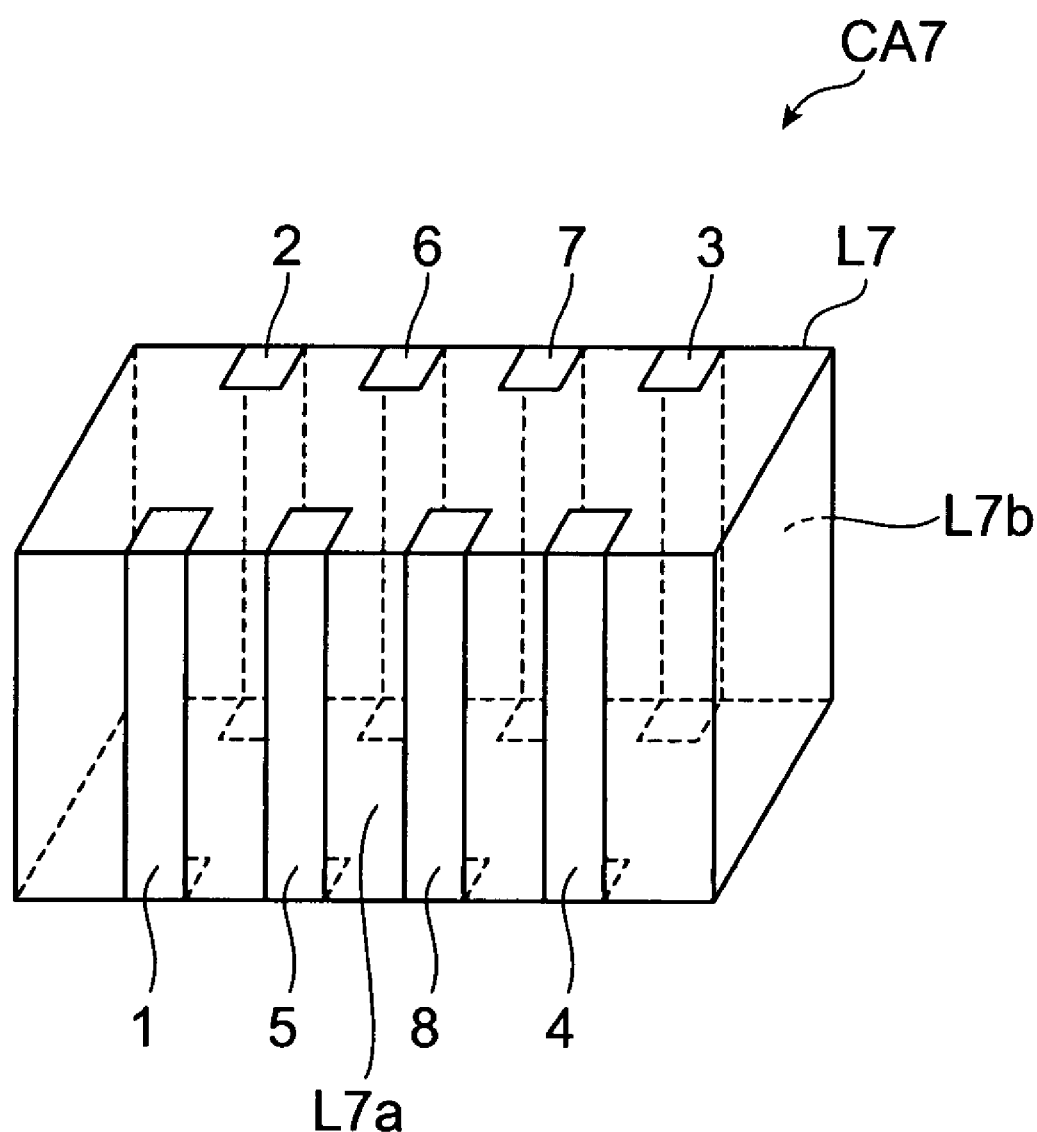
FIG. 13 is a perspective view of the multilayer capacitor array in accordance with a seventh embodiment.
Figure 14:
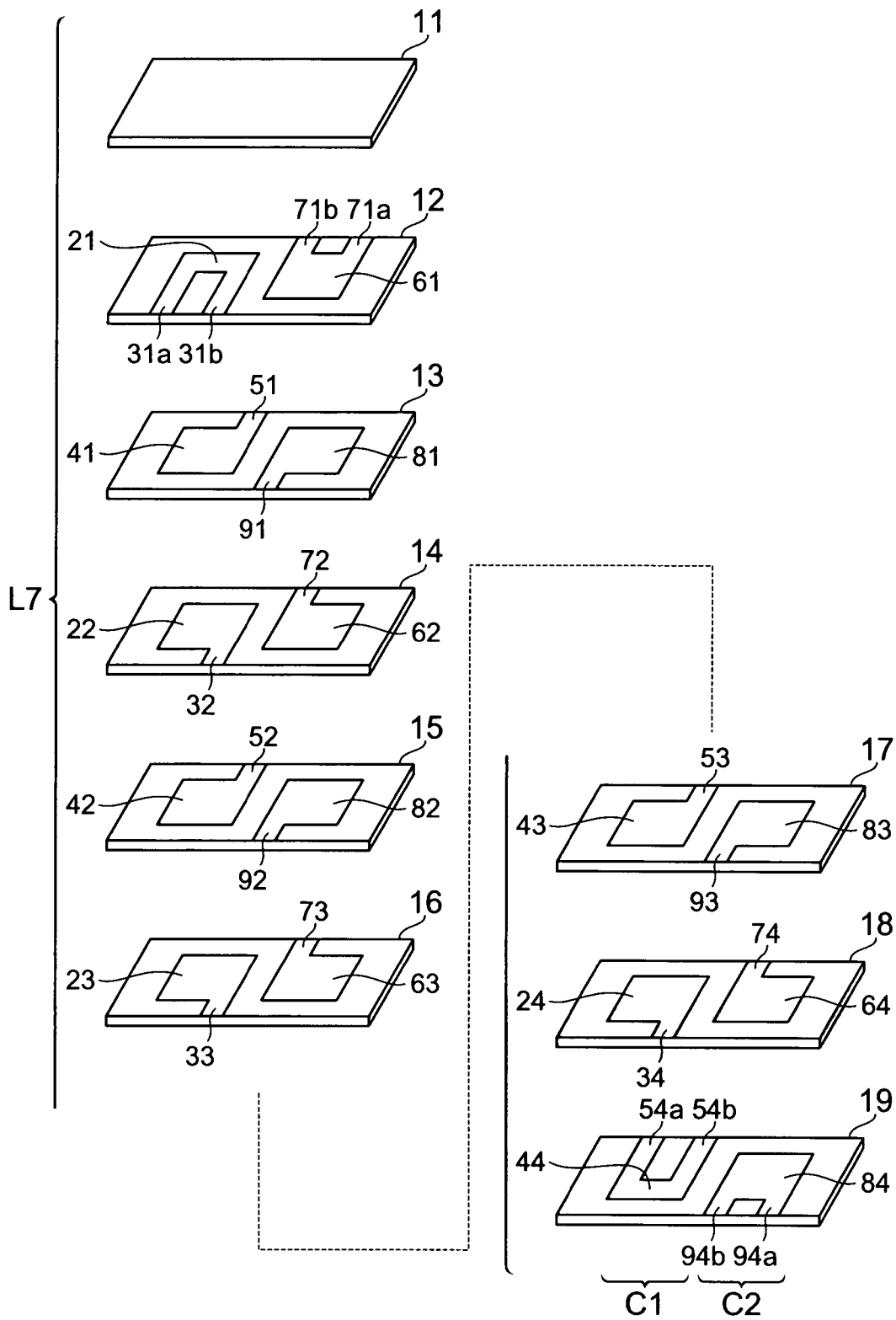
FIG. 14 is an exploded perspective view of the multilayer body included in the multilayer capacitor array in accordance with the seventh embodiment.

With reference to FIGS. 13 and 14, the structure of multilayer capacitor array CA7 in accordance with a seventh embodiment will be explained. The multilayer capacitor array CA7 in accordance with the seventh embodiment differs from the multilayer capacitor array CA2 in accordance with the second embodiment in terms of the magnitude of equivalent series resistance in the first capacitor. FIG. 13 is a perspective view of the multilayer capacitor array in accordance with the seventh embodiment. FIG. 14 is an exploded perspective view of the multilayer body included in the multilayer capacitor array in accordance with the seventh embodiment.

As shown in FIG. 13, the multilayer capacitor array CA7 in accordance with the seventh embodiment comprises a multilayer body L7 having a substantially rectangular parallelepiped form, and first to fourth terminal conductors 1 to 4 and first to fourth outer connecting conductors 5 to 8 which are a plurality of outer conductors formed on side faces of the multilayer body L7.

The first and fourth terminal conductors 1, 4 and first and fourth outer connecting conductors 5, 8 are positioned on a first side face L7a in the side faces parallel to the laminating direction of the multilayer body L7. The first and fourth terminal conductors 1, 4 and first and fourth outer connecting conductors 5, 8 are formed in the order of the first terminal conductor 1, first outer connecting conductor 5, fourth outer connecting conductor 8, and fourth terminal conductor 4 from the left side to right side in FIG. 13.

The second and third terminal conductors 2, 3 and second and third outer connecting conductors 6, 7 are positioned on a second side face L7b opposing the first side face 7a in the side faces parallel to the laminating direction of the multilayer body L7. The second and third terminal conductors 2, 3 and second and third outer connecting conductors 6, 7 are formed in the order of the second terminal conductor 2, second outer connecting conductor 6, third outer connecting conductor 7, and third terminal conductor 3 from the left side to right side in FIG. 13.

As shown in FIG. 14, the multilayer body L7 is constructed by laminating a plurality of (9 in this embodiment) dielectric layers 11 to 19. The multilayer body L7 includes a first electrode group having a plurality of (4 each in this embodiment) first and second inner electrodes 21 to 24, 41 to 44 and a second electrode group having a plurality of (4 each in this embodiment) third and fourth inner electrodes 61 to 64, 81 to 84. The first and second electrode groups are arranged in parallel in a direction orthogonal to the laminating direction of the dielectric layers 11 to 19 within the multilayer body L7.

The multilayer capacitor array CA7 includes a first capacitor C1 formed by the plurality of first and second inner electrodes 21 to 24, 41 to 44 and the dielectric layers 12 to 18 held one by one between the plurality of first and second inner electrodes 21 to 24, 41 to 44, and a second capacitor C2 formed by the plurality of third and fourth inner electrodes 61 to 64, 81 to 84 and the dielectric layers 12 to 18 held one by one between the plurality of third and fourth inner electrodes 61 to 64, 81 to 84.

Namely, the plurality of first and second inner electrodes 21 to 24, 41 to 44 have areas where they oppose each other in the laminating direction with the dielectric layers 12 to 18 in between. The plurality of third and fourth inner electrodes 61 to 64, 81 to 84 have areas opposing each other in the laminating direction with the dielectric layers 12 to 18 in between. However, the area of the first inner electrode 21 is smaller than the area of the third inner electrode 61 laminated on the same layer. The area of the second inner electrode 44 is smaller than the area of the fourth inner electrode 84 laminated on the same layer. Consequently, the area where the first and second inner electrodes 21, 41 oppose each other in the laminating direction is smaller than the area where the third and fourth inner electrodes 61, 81 oppose each other in the laminating direction. The area where first and second inner electrodes 24, 44 oppose each other in the laminating direction is smaller than the area where the third and fourth inner electrodes 64, 84 oppose each other in the laminating direction.

In the multilayer capacitor array CA7, the first and third inner electrodes 21, 61, the first and third inner electrodes 22, 62, the first and third inner electrodes 23, 63, and the first and third inner electrodes 24, 64 are positioned on the same layers in the laminating direction. Also, the second and fourth inner electrodes 41, 81, the second and fourth inner electrodes 42, 82, the second and fourth inner electrodes 43, 83, and the second and fourth inner electrodes 44, 84 are positioned on the same layers in the laminating direction.

The first inner electrode 21 is formed with a lead conductor 31a extending so as to be drawn to the first side face L7a of the multilayer body L7. The first inner electrodes 21 to 24 are formed with respective lead conductors 31b, 32 to 34 extending so as to be drawn to the first side face L7a of the multilayer body L7.

The first inner electrode 21 is electrically connected to the first terminal conductor 1 through the lead conductor 31a. The first inner electrodes 21 to 24 are electrically connected to the first outer connecting conductor 5 through the lead conductors 31b, 32 to 34, respectively. As a result, not only the first inner electrode 21 but also the first inner electrodes 22 to 24 are electrically connected to the first terminal conductor 1 through the first outer connecting conductor 5.

The second inner electrode 44 is formed with a lead conductor 54a extending so as to be drawn to the second side face L7b of the multilayer body L7. The second inner electrodes 41 to 44 are formed with respective lead conductors 51 to 53, 54b extending so as to be drawn to the second side face L7b of the multilayer body L7.

The second inner electrode 44 is electrically connected to the second terminal conductor 2 through the lead conductor 54a. The second inner electrodes 41 to 44 are electrically connected to the second outer connecting conductor 6 through the lead conductors 51 to 53, 54b, respectively. As a result, not only the second inner electrode 44 but also the second inner electrodes 41 to 43 are electrically connected to the second terminal conductor 2 through the second outer connecting conductor 6.

The third inner electrode 61 is formed with a lead conductor 71a extending so as to be drawn to the second side face L7b of the multilayer body L7. The third inner electrodes 61 to 64 are formed with respective lead conductors 71b, 72 to 74 extending so as to be drawn to the second side face L7b of the multilayer body L7.

The third inner electrode 61 is electrically connected to the third terminal conductor 3 through the lead conductor 71a. The third inner electrodes 61 to 64 are electrically connected to the third outer connecting conductor 7 through the lead conductors 71b, 72 to 74, respectively. As a result, not only the third inner electrode 61 but also the third inner electrodes 62 to 64 are electrically connected to the third terminal conductor 3 through the third outer connecting conductor 7.

The fourth inner electrode 84 is formed with a lead conductor 94a extending so as to be drawn to the first side face L7a of the multilayer body L7. The fourth inner electrodes 81 to 84 are formed with respective lead conductors 91 to 93, 94b extending so as to be drawn to the first side face L7a of the multilayer body L7.

The fourth inner electrode 84 is electrically connected to the fourth terminal conductor 4 through the lead conductor 94a. The fourth inner electrodes 81 to 84 are electrically connected to the fourth outer connecting conductor 8 through the lead conductors 91 to 93, 94b, respectively. As a result, not only the fourth inner electrode 84 but also the fourth inner electrodes 81 to 83 are electrically connected to the fourth terminal conductor 4 through the fourth outer connecting conductor 8.

In the first capacitor C1 in the multilayer capacitor array CA7, the first terminal conductor 1 is electrically connected to the first inner electrodes 22 to 24 through the first outer connecting conductor 5 and first inner electrode 21. Also, in the first capacitor C1, the second terminal conductor 2 is electrically connected to the second inner electrodes 41 to 43 through the second outer connecting conductor 6 and second inner electrode 44. These make the first capacitor C1 have an equivalent series resistance greater than that of the conventional capacitor in a multilayer capacitor array in which all the inner electrodes are connected to their corresponding terminal conductors through lead conductors.

In the second capacitor C2 in the multilayer capacitor array CA7, the third terminal conductor 3 is electrically connected to the third inner electrodes 62 to 64 through the third outer connecting conductor 7 and third inner electrode 61. Also, in the second capacitor C2, the fourth terminal conductor 4 is electrically connected to the fourth inner electrodes 81 to 83 through the fourth outer connecting conductor 8 and fourth inner electrode 84. These make the second capacitor C2 have an equivalent series resistance greater than that of the conventional capacitor in a multilayer capacitor array in which all the inner electrodes are connected to their corresponding terminal conductors through lead conductors.

Thus, the multilayer capacitor array CA7 allows each of the first and second capacitors C1, C2 included therein to have an equivalent series resistance greater than that of the conventional capacitor in which all the inner electrodes are connected to their corresponding terminal conductors through lead conductors.

As explained in the foregoing, the multilayer capacitor array CA7 can regulate the equivalent series resistance.

In the multilayer capacitor array CA7, the area of the first inner electrode 21 is smaller than the area of the third inner electrode 61 laminated on the same layer. The area of the second inner electrode 44 is smaller than the area of the fourth inner electrode 64 laminated on the same layer. Consequently, the equivalent series resistance of the first capacitor C1 becomes greater than that of the second capacitor C2. Thus, the multilayer capacitor array CA7 can include capacitors having equivalent series resistances different from each other.

The first capacitor C1 can set the equivalent series resistance to a desirable value by adjusting the number or position in the laminating direction of at least one species of first inner electrode 21 and second inner electrode 44. The second capacitor C2 can set the equivalent series resistance to a desirable value by adjusting the number or position in the laminating direction of at least one species of third inner electrode 61 and fourth inner electrode 84. Consequently, the multilayer capacitor array CA7 can regulate the equivalent series resistance easily and accurately.

In the multilayer capacitor array CA7, the plurality of first and second inner electrodes 21 to 24, 41 to 44 are positioned so as to oppose each other, with one of the dielectric layers 12 to 18 in between each pair. On the other hand, the plurality of third and fourth inner electrodes 61 to 64, 81 to 84 are positioned so as to oppose each other, with one of the dielectric layers 12 to 18 in between each pair. These allow the capacitors C1, C2 formed in the multilayer capacitor array CA7 to regulate the equivalent series resistance such as to make it greater while increasing the capacitance.

Eighth Embodiment

Figure 15:
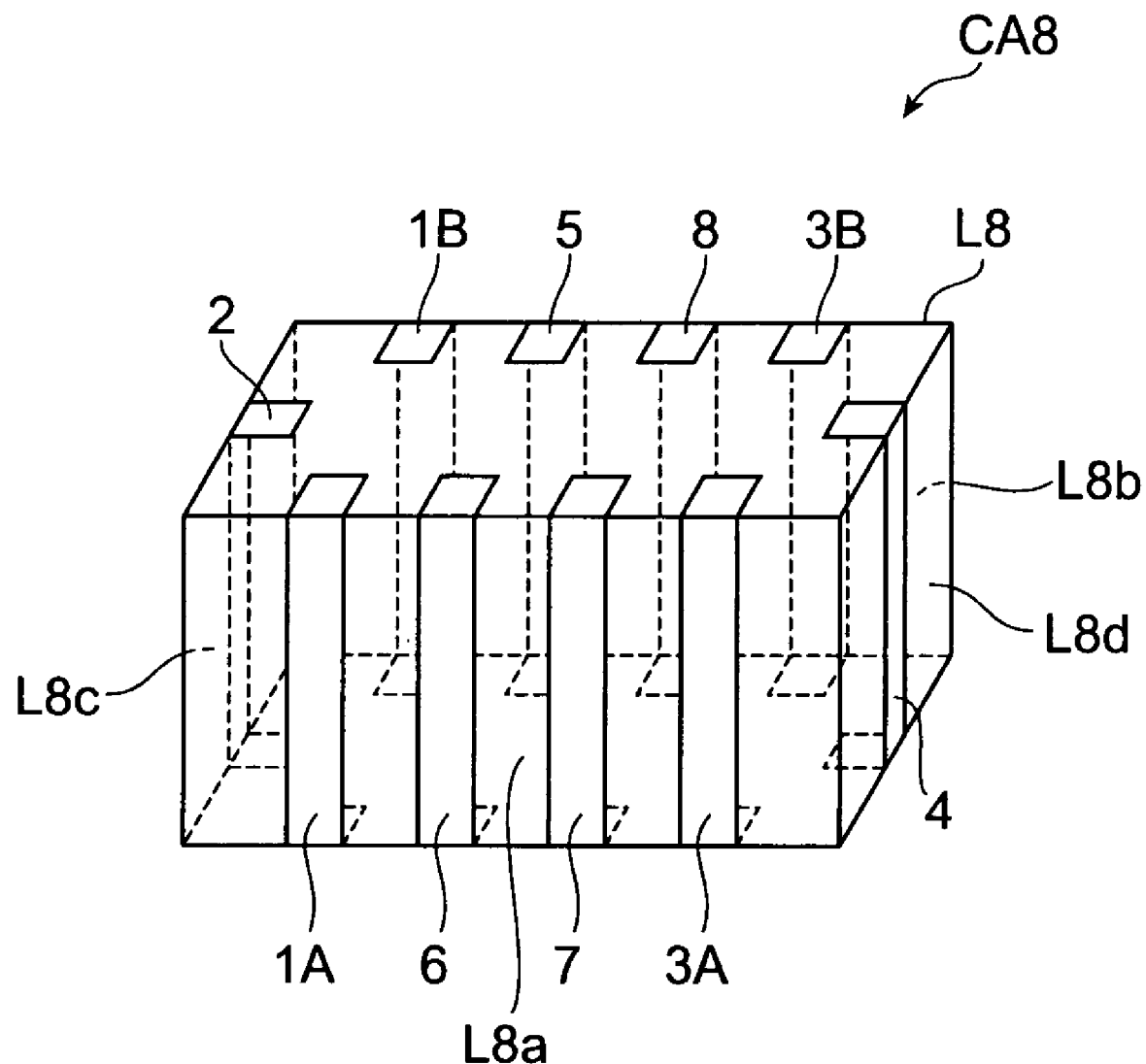
FIG. 15 is a perspective view of the multilayer capacitor array in accordance with an eighth embodiment.
Figure 16:
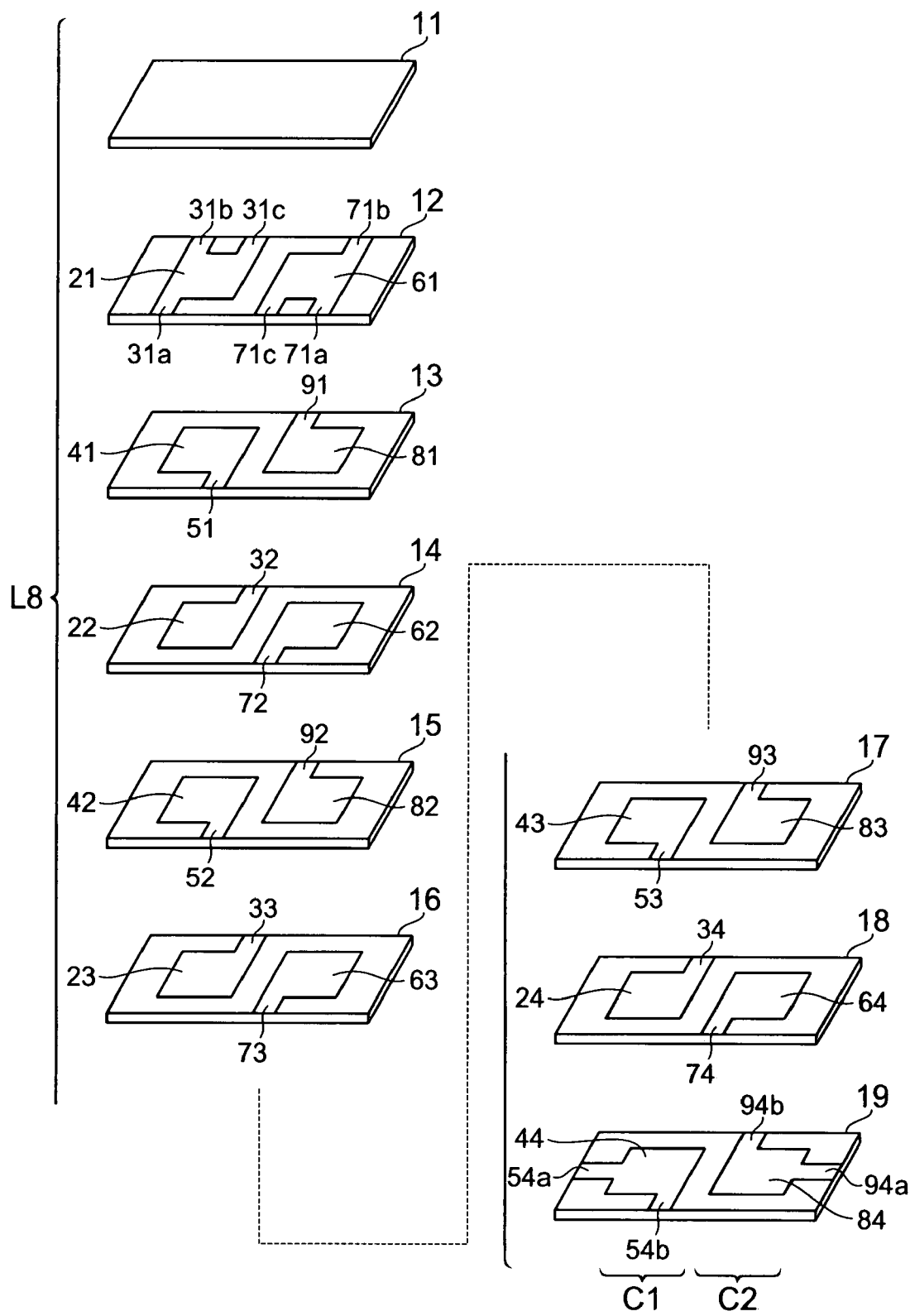
FIG. 16 is an exploded perspective view of the multilayer body included in the multilayer capacitor array in accordance with the eighth embodiment.

With reference to FIGS. 15 and 16, the structure of multilayer capacitor array CA8 in accordance with an eighth embodiment will be explained. The multilayer capacitor array CA8 in accordance with the eighth embodiment differs from the multilayer capacitor array CA1 in accordance with the first embodiment in terms of the number and arrangement of outer connecting conductors formed on the multilayer body. FIG. 15 is a perspective view of the multilayer capacitor array in accordance with the eighth embodiment. FIG. 16 is an exploded perspective view of the multilayer body included in the multilayer capacitor array in accordance with the eighth embodiment.

As shown in FIG. 15, the multilayer capacitor array CA8 in accordance with the eighth embodiment comprises a multilayer body L8 having a substantially rectangular parallelepiped form, and first to fourth terminal conductors 1A, 1B, 2A, 2B, 3, 4 and first to fourth outer connecting conductors 5 to 8 which are a plurality of outer conductors formed on side faces of the multilayer body L8.

The first and third terminal conductors 1A, 3A and second and third outer connecting conductors 6, 7 are positioned on a first side face L8a in the side faces parallel to the laminating direction of the multilayer body L8. The first and third terminal conductors 1A, 3A and second and third outer connecting conductors 6, 7 are formed in the order of the first terminal conductor 1A, second outer connecting conductor 6, third outer connecting conductor 7, and third terminal conductor 3A from the left side to right side in FIG. 15.

The first and third terminal conductors 1B, 3B and first and fourth outer connecting conductors 5, 8 are positioned on a second side face L8b opposing the first side face L8a in the side faces parallel to the laminating direction of the multilayer body L8. The first and third terminal conductors 1B, 3B and first and fourth outer connecting conductors 5, 8 are formed in the order of the first terminal conductor 1B, first outer connecting conductor 5, fourth outer connecting conductor 8, and third terminal conductor 3B from the left side to right side in FIG. 15.

The second terminal conductor 2 is positioned on a third side face L8c in the side faces parallel to the laminating direction of the multilayer body L8, i.e., the third side face L8c that is a side face extending in the lateral direction of the side faces orthogonal to the laminating direction of the multilayer body L8. The fourth terminal conductor 4 is positioned on a fourth side face L8d in the side faces parallel to the laminating direction of the multilayer body L8, i.e., the fourth side face L8d that is a side face extending in the lateral direction of the side faces orthogonal to the laminating direction of the multilayer body L8 and opposing the third side face L8c.

As shown in FIG. 16, the multilayer body L8 is constructed by laminating a plurality of (9 in this embodiment) dielectric layers 11 to 19. The multilayer body L8 includes a first electrode group having a plurality of (4 each in this embodiment) first and second inner electrodes 21 to 24, 41 to 44 and a second electrode group having a plurality of (4 each in this embodiment) third and fourth inner electrodes 61 to 64, 81 to 84. The first and second electrode groups are arranged in parallel in a direction orthogonal to the laminating direction of the dielectric layers 11 to 19 within the multilayer body L8.

The multilayer capacitor array CA8 includes a first capacitor C1 formed by the plurality of first and second inner electrodes 21 to 24, 41 to 44 and the dielectric layers 12 to 18 held one by one between the plurality of first and second inner electrodes 21 to 24, 41 to 44, and a second capacitor C2 formed by the plurality of third and fourth inner electrodes 61 to 64, 81 to 84 and the dielectric layers 12 to 18 held one by one between the plurality of third and fourth inner electrodes 61 to 64, 81 to 84.

In the multilayer capacitor array CA8, the first and third inner electrodes 21, 61, the first and third inner electrodes 22, 62, the first and third inner electrodes 23, 63, and the first and third inner electrodes 24, 64 are positioned on the same layers in the laminating direction. Also, the second and fourth inner electrodes 41, 81, the second and fourth inner electrodes 42, 82, the second and fourth inner electrodes 43, 83, and the second and fourth inner electrodes 44, 84 are positioned on the same layers in the laminating direction.

The first inner electrode 21 is formed with a lead conductor 31a extending so as to be drawn to the first side face L8a of the multilayer body L8. The first inner electrode 21 is further formed with lead conductors 31b, 31c extending so as to be drawn to the second side face L8b of the multilayer body L8. The first inner electrodes 22 to 24 are formed with respective lead conductors 32 to 34 extending so as to be drawn to the second side face L8b of the multilayer body L8.

From the first inner electrode 21, the lead conductor 31a extends so as to reach the first side face L8a of the multilayer body L8, while the lead conductors 31b, 31c extend so as to reach the second side face L8b of the multilayer body L8. The lead conductor 32 extends from the first inner electrode 22 so as to reach the second side face L8b of the multilayer body L8. The lead conductor 33 extends from the first inner electrode 23 so as to reach the second side face L8b of the multilayer body L8. The lead conductor 34 extends from the first inner electrode 24 so as to reach the second side face L8b of the multilayer body L8.

The first inner electrode 21 is electrically connected to the first terminal conductor 1A through the lead conductor 31a. The first inner electrode 21 is electrically connected to the first terminal conductor 1B through the lead conductor 31b. The first inner electrodes 21 to 24 are electrically connected to the first outer connecting conductor 5 through the lead conductors 31c, 32 to 34, respectively. As a result, not only the first inner electrode 21 but also the first inner electrodes 22 to 24 are electrically connected to the first terminal conductors 1A, 1B through the first outer connecting conductor 5.

The second inner electrode 44 is formed with a lead conductor 54a extending so as to be drawn to the third side face L8c of the multilayer body L8. The second inner electrodes 41 to 44 are formed with respective lead conductors 51 to 53, 54b extending so as to be drawn to the first side face L8a of the multilayer body L8.

The lead conductor 51 extends from the second inner electrode 41 so as to reach the first side face L8a of the multilayer body L8. The lead conductor 52 extends from the second inner electrode 42 so as to reach the first side face L8a of the multilayer body L8. The lead conductor 53 extends from the second inner electrode 43 so as to reach the first side face L8a of the multilayer body L8. The lead conductors 54a and 54b extend from the second inner electrode 44 so as to reach the third side face L8c and first side face L8a of the multilayer body L8, respectively.

The second inner electrode 44 is electrically connected to the second terminal conductor 2 through the lead conductor 54a. The second inner electrodes 41 to 44 are electrically connected to the second outer connecting conductor 6 through the lead conductors 51 to 53, 54b, respectively. As a result, not only the second inner electrode 44 but also the second inner electrodes 41 to 43 are electrically connected to the second terminal conductor 2 through the second outer connecting conductor 6.

The third inner electrode 61 is formed with lead conductors 71a, 71c extending so as to be drawn to the first side face L8a of the multilayer body L8. The third inner electrode 61 is further formed with a lead conductor 71b extending so as to be drawn to the second side face L8b of the multilayer body L8. The third inner electrodes 62 to 64 are formed with respective lead conductors 72 to 74 extending so as to be drawn to the second side face L8b of the multilayer body L8.

From the third inner electrode 61, the lead conductors 71a, 71c extend so as to reach the first side face L8a of the multilayer body L8, while the lead conductor 71b extends so as to reach the second side face L8b of the multilayer body 8. The lead conductor 72 extends from the third inner electrode 62 so as to reach the first side face L8a of the multilayer body L8. The lead conductor 73 extends from the third inner electrode 63 so as to reach the first side face L8a of the multilayer body L8. The lead conductor 74 extends from the third inner electrode 64 so as to reach the first side face L8a of the multilayer body L8.

The third inner electrode 61 is electrically connected to the third terminal conductor 3A through the lead conductor 71a. The third inner electrode 61 is electrically connected to the third terminal conductor 3B through the lead conductor 71b. The third inner electrodes 61 to 64 are electrically connected to the third outer connecting conductor 7 through the lead conductors 71c, 72 to 74, respectively. As a result, not only the third inner electrode 61 but also the third inner electrodes 62 to 64 are electrically connected to the third terminal conductors 3A, 3B through the third outer connecting conductor 7.

The fourth inner electrode 84 is formed with a lead conductor 94a extending so as to be drawn to the fourth side face L8d of the multilayer body L8. The fourth inner electrodes 81 to 84 are formed with respective lead conductors 91 to 93, 94b extending so as to be drawn to the second side face L8b of the multilayer body L8.

The lead conductor 91 extends from the fourth inner electrode 81 so as to reach the second side face L8b of the multilayer body L8. The lead conductor 92 extends from the fourth inner electrode 82 so as to reach the second side face L8b of the multilayer body 8. The lead conductor 93 extends from the fourth inner electrode 83 so as to reach the second side face L8b of the multilayer body 8. The lead conductors 94a and 94b extend from the fourth inner electrode 84 so as to reach the fourth side face L8d and second side face L8b of the multilayer body L8, respectively.

The fourth inner electrode 84 is electrically connected to the fourth terminal conductor 4 through the lead conductor 94a. The fourth inner electrodes 81 to 84 are electrically connected to the fourth outer connecting conductor 8 through the lead conductors 91 to 93, 94b, respectively. As a result, not only the fourth inner electrode 84 but also the fourth inner electrodes 81 to 83 are electrically connected to the fourth terminal conductor 4 through the fourth outer connecting conductor 8.

In the first capacitor C1 in the multilayer capacitor array CA8, the first terminal conductors 1A, 1B are electrically connected to the first inner electrodes 22 to 24 through the first outer connecting conductor 5 and first inner electrode 21. Also, in the first capacitor C1, the second terminal conductor 2 is electrically connected to the second inner electrodes 41 to 43 through the second outer connecting conductor 6 and second inner electrode 44. These make the first capacitor C1 have an equivalent series resistance greater than that of the conventional capacitor in a multilayer capacitor array in which all the inner electrodes are connected to their corresponding terminal conductors through lead conductors.

In the second capacitor C2 in the multilayer capacitor array CA8, the third terminal conductors 3A, 3B are electrically connected to the third inner electrodes 62 to 64 through the third outer connecting conductor 7 and third inner electrode 61. Also, in the second capacitor C2, the fourth terminal conductor 4 is electrically connected to the fourth inner electrodes 81 to 83 through the fourth outer connecting conductor 8 and fourth inner electrode 84. These make the second capacitor C2 have an equivalent series resistance greater than that of the conventional capacitor in a multilayer capacitor array in which all the inner electrodes are connected to their corresponding terminal conductors through lead conductors.

Thus, the multilayer capacitor array CA8 allows each of the first and second capacitors C1, C2 included therein to have an equivalent series resistance greater than that of the conventional capacitor in which all the inner electrodes are connected to their corresponding terminal conductors through lead conductors.

As explained in the foregoing, the multilayer capacitor array CA8 can regulate the equivalent series resistance.

The first capacitor C1 can set the equivalent series resistance to a desirable value by adjusting the number or position in the laminating direction of at least one species of first inner electrode 21 and second inner electrode 44. The second capacitor C2 can set the equivalent series resistance to a desirable value by adjusting the number or position in the laminating direction of at least one species of third inner electrode 61 and fourth inner electrode 84. Consequently, the multilayer capacitor array CA8 can regulate the equivalent series resistance easily and accurately.

In the multilayer capacitor array CA8, the plurality of first and second inner electrodes 21 to 24, 41 to 44 are positioned so as to oppose each other, with one of the dielectric layers 12 to 18 in between each pair. On the other hand, the plurality of third and fourth inner electrodes 61 to 64, 81 to 84 are positioned so as to oppose each other, with one of the dielectric layers 12 to 18 in between each pair. These allow the capacitors C1, C2 formed in the multilayer capacitor array CA8 to regulate the equivalent series resistance such as to make it greater while increasing the capacitance.

Ninth Embodiment

Figure 17:
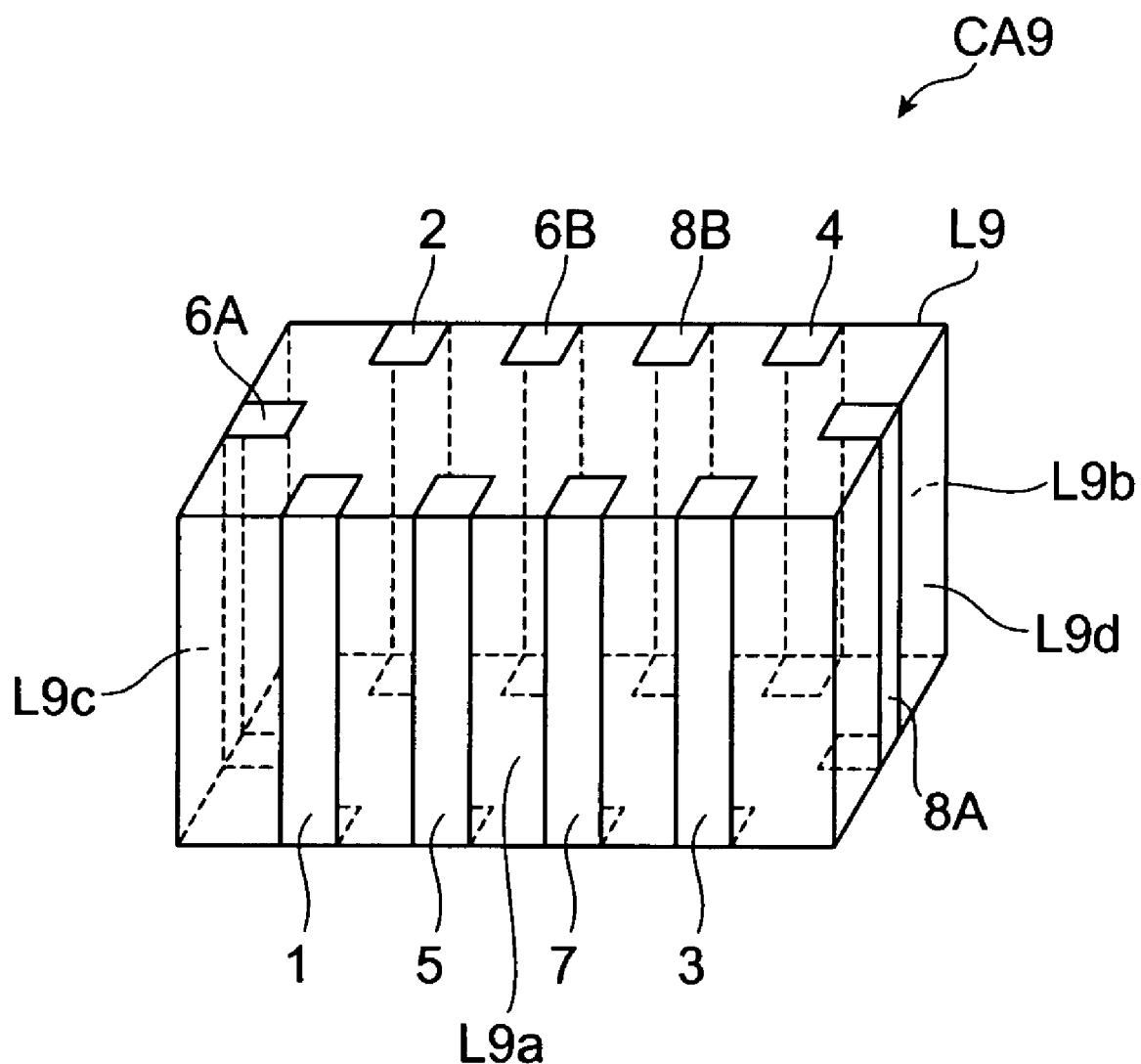
FIG. 17 is a perspective view of the multilayer capacitor array in accordance with a ninth embodiment.
Figure 18:
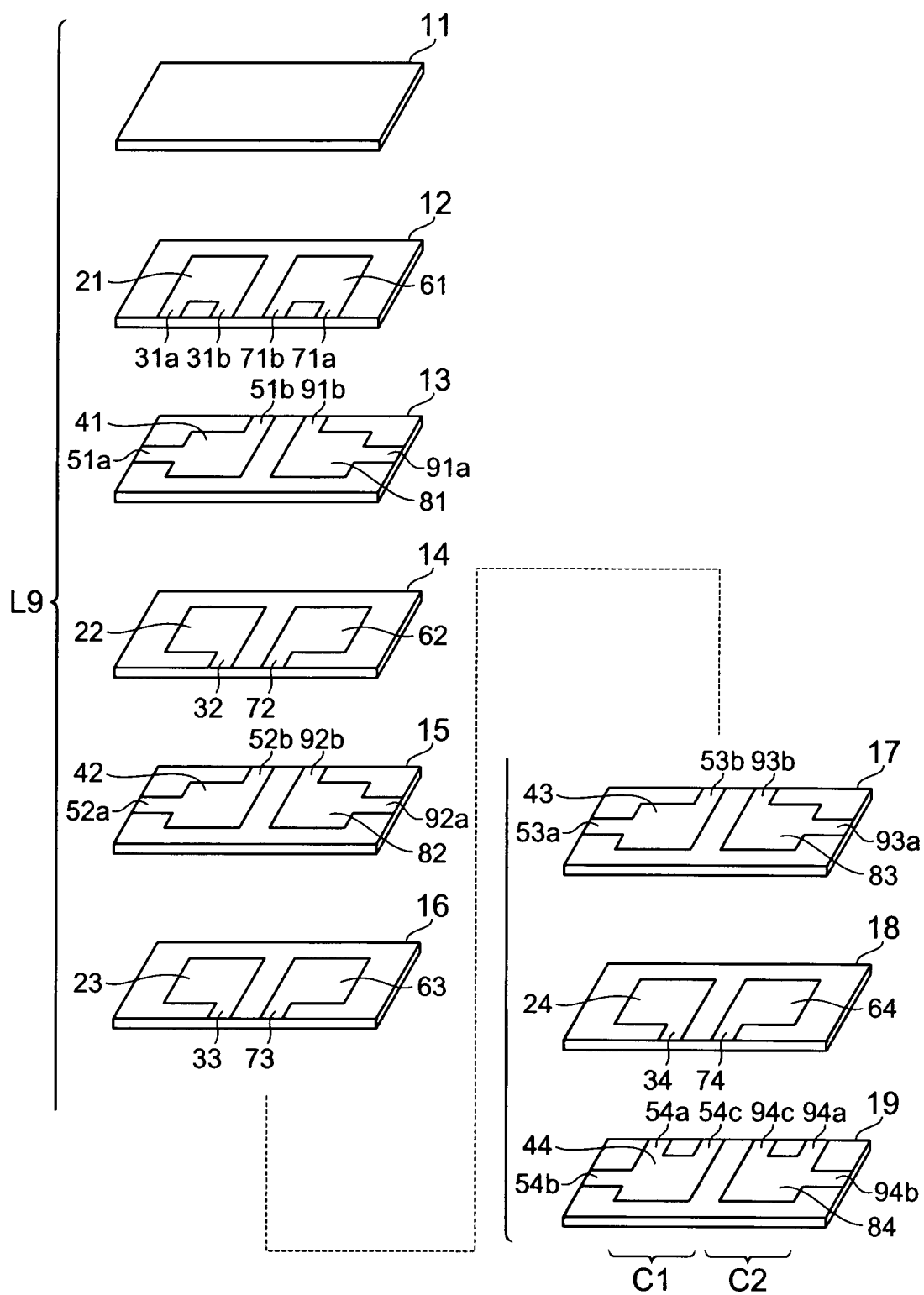
FIG. 18 is an exploded perspective view of the multilayer body included in the multilayer capacitor array in accordance with the ninth embodiment.

With reference to FIGS. 17 and 18, the structure of multilayer capacitor array CA9 in accordance with a ninth embodiment will be explained. The multilayer capacitor array CA9 in accordance with the ninth embodiment differs from the multilayer capacitor array CA8 in accordance with the eighth embodiment in terms of the structure and arrangement of outer connecting conductors formed on the multilayer body. FIG. 17 is a perspective view of the multilayer capacitor array in accordance with the ninth embodiment. FIG. 18 is an exploded perspective view of the multilayer body included in the multilayer capacitor array in accordance with the ninth embodiment.

As shown in FIG. 17, the multilayer capacitor array CA9 in accordance with the ninth embodiment comprises a multilayer body L9 having a substantially rectangular parallelepiped form, and first to fourth terminal conductors 1 to 4 and first to fourth outer connecting conductors 5, 6A, 6B, 7, 8A, 8B.

The first and third terminal conductors 1, 3 and first and third outer connecting conductors 5, 7 are positioned on a first side face L9a in the side faces parallel to the laminating direction of the multilayer body L9. The first and third terminal conductors 1, 3 and first and third outer connecting conductors 5, 7 are formed in the order of the first terminal conductor 1, first outer connecting conductor 5, third outer connecting conductor 7, and third terminal conductor 3 from the left side to right side in FIG. 17.

The second and fourth terminal conductors 2, 4 and second and fourth outer connecting conductors 6B, 8B are positioned on a second side face L9b opposing the first side face L9a in the side faces parallel to the laminating direction of the multilayer body L9. The second and fourth terminal conductors 2, 4 and second and fourth outer connecting conductors 6B, 8B are formed in the order of the second terminal conductor 2, second outer connecting conductor 6B, fourth outer connecting conductor 8B, and fourth terminal conductor 4 from the left side to right side in FIG. 17.

The second outer connecting conductor 6A is positioned on a third side face L9c in the side faces parallel to the laminating direction of the multilayer body L9. The fourth outer connecting conductor 8A is positioned on a fourth side face L9d opposing the third side face L9c in the side faces parallel to the laminating direction of the multilayer body L9.

As shown in FIG. 18, the multilayer body L9 is constructed by laminating a plurality of (9 in this embodiment) dielectric layers 11 to 19. The multilayer body L9 includes a first electrode group having a plurality of (4 each in this embodiment) first and second inner electrodes 21 to 24, 41 to 44 and a second electrode group having a plurality of (4 each in this embodiment) third and fourth inner electrodes 61 to 64, 81 to 84. The first and second electrode groups are arranged in parallel in a direction orthogonal to the laminating direction of the dielectric layers 11 to 19 within the multilayer body L9.

The multilayer capacitor array CA9 includes a first capacitor C1 formed by the plurality of first and second inner electrodes 21 to 24, 41 to 44 and the dielectric layers 12 to 18 held one by one between the plurality of first and second inner electrodes 21 to 24, 41 to 44, and a second capacitor C2 formed by the plurality of third and fourth inner electrodes 61 to 64, 81 to 84 and the dielectric layers 12 to 18 held one by one between the plurality of third and fourth inner electrodes 61 to 64, 81 to 84.

In the multilayer capacitor array CA9, the first and third inner electrodes 21, 61, the first and third inner electrodes 22, 62, the first and third inner electrodes 23, 63, and the first and third inner electrodes 24, 64 are positioned on the same layers in the laminating direction. Also, the second and fourth inner electrodes 41, 81, the second and fourth inner electrodes 42, 82, the second and fourth inner electrodes 43, 83, and the second and fourth inner electrodes 44, 84 are positioned on the same layers in the laminating direction.

The first inner electrode 21 is formed with lead conductors 31a, 31b extending so as to be drawn to the first side face L9a of the multilayer body L9. The first inner electrodes 22 to 24 are formed with respective lead conductors 32 to 34 extending so as to be drawn to the first side face L9a of the multilayer body L9.

The lead conductors 31a, 31b extend from the first inner electrode 21 so as to reach the first side face L9a of the multilayer body L9. The lead conductor 32 extends from the first inner electrode 22 so as to reach the first side face L9a of the multilayer body L9. The lead conductor 33 extends from the first inner electrode 23 so as to reach the first side face L9a of the multilayer body L9. The lead conductor 34 extends from the first inner electrode 24 so as to reach the first side face L9a of the multilayer body L9.

The first inner electrode 21 is electrically connected to the first terminal conductor 1A through the lead conductor 31a. The first inner electrodes 21 to 24 are electrically connected to the first outer connecting conductor 5 through the lead conductors 31b, 32 to 34, respectively. As a result, not only the first inner electrode 21 but also the first inner electrodes 22 to 24 are electrically connected to the first terminal conductor 1A through the first outer connecting conductor 5.

The second inner electrode 44 is formed with lead conductors 54a, 54c extending so as to be drawn to the second side face L9b of the multilayer body L9. The second inner electrode 44 is further formed with a lead conductor 54b extending so as to be drawn to the third side face L9c of the multilayer body 9. The second inner electrodes 41 to 43 are formed with respective lead conductors 51a to 53a extending so as to be drawn to the third side face L9c of the multilayer body L9. The second inner electrodes 41 to 43 are formed with respective lead conductors 51b to 53b extending so as to be drawn to the second side face L9b of the multilayer body L9.

The lead conductors 51a and 51b extend from the second inner electrode 41 so as to reach the third side face L9c and second side face L9b of the multilayer body L9, respectively. The lead conductors 52a and 52b extend from the second inner electrode 42 so as to reach the third side face L9c and second side face L9b of the multilayer body L9, respectively. The lead conductors 53a and 53b extend from the second inner electrode 43 so as to reach the third side face L9c and second side face L9b of the multilayer body L9, respectively. From the second inner electrode 44, the lead conductors 54a and 54c extend so as to reach the second side face L9b of the multilayer body L9, while the lead conductor 54b extends so as to reach the third side face L9c of the multilayer body L9.

The second inner electrode 44 is electrically connected to the second terminal conductor 2 through the lead conductor 54a. The second inner electrodes 41 to 44 are electrically connected to the second outer connecting conductor 6A through the lead conductors 51a to 53a, 54b, respectively. Further, the inner electrodes 41 to 44 are electrically connected to the second outer connecting conductor 6B through the lead conductors 51b to 53b, 54c, respectively. As a result, not only the second inner electrode 44 but also the second inner electrodes 41 to 43 are electrically connected to the second terminal conductor 2 through the second outer connecting conductors 6A, 6B.

The third inner electrode 61 is formed with lead conductors 71a, 71b extending so as to be drawn to the first side face L9a of the multilayer body L9. The third inner electrodes 62 to 64 are formed with respective lead conductors 72 to 74 extending so as to be drawn to the first side face L9a of the multilayer body L9.

The lead conductors 71a, 71b extend from the third inner electrode 61 so as to reach the first side face L9a of the multilayer body L9. The lead conductor 72 extends from the third inner electrode 62 so as to reach the first side face L9a of the multilayer body L9. The lead conductor 73 extends from the third inner electrode 63 so as to reach the first side face L9a of the multilayer body L9. The lead conductor 74 extends from the third inner electrode 64 so as to reach the first side face L9a of the multilayer body L9.

The third inner electrode 61 is electrically connected to the third terminal conductor 3 through the lead conductor 71a. The third inner electrodes 61 to 64 are electrically connected to the third outer connecting conductor 7 through the lead conductors 71b, 72 to 74, respectively. As a result, not only the third inner electrode 61 but also the third inner electrodes 62 to 64 are electrically connected to the third terminal conductor 3 through the third outer connecting conductor 7.

The fourth inner electrode 84 is formed with lead conductors 94a, 94c extending so as to be drawn to the second side face L9b of the multilayer body L9. The fourth inner electrode 84 is further formed with a lead conductor 94b extending so as to be drawn to the fourth side face L9d of the multilayer body L9. The fourth inner electrodes 81 to 83 are formed with respective lead conductors 91a to 93a extending so as to be drawn to the fourth side face L9d of the multilayer body L9. The fourth inner electrodes 81 to 83 are formed with respective lead conductors 91b to 93b extending so as to be drawn to the second side face L9b of the multilayer body L9.

The lead conductors 91a and 91b extend from the fourth inner electrode 81 so as to reach the fourth side face L9d and second side face L9b of the multilayer body L9, respectively. The lead conductors 92a and 92b extend from the fourth inner electrode 82 so as to reach the fourth side face L9d and second side face L9b of the multilayer body L9, respectively. The lead conductors 93a and 93b extend from the fourth inner electrode 83 so as to reach the fourth side face L9d and second side face L9b of the multilayer body L9, respectively. From the fourth inner electrode 84, the lead conductors 94a and 94c extend so as to reach the second side face L9b of the multilayer body L9, while the lead conductor 94b extends so as to reach the fourth side face L9d of the multilayer body L9.

The fourth inner electrode 84 is electrically connected to the fourth terminal conductor 4 through the lead conductor 94a. The fourth inner electrodes 81 to 84 are electrically connected to the fourth outer connecting conductor 8A through the lead conductors 91a to 93a, 94b, respectively. The fourth inner electrodes 81 to 84 are electrically connected to the fourth outer connecting conductor 8B through the lead conductors 91b to 93b, 94c, respectively. As a result, not only the fourth inner electrode 84 but also the fourth inner electrodes 81 to 83 are electrically connected to the fourth terminal conductor 4 through the fourth outer connecting conductors 8A, 8B.

In the first capacitor C1 in the multilayer capacitor array CA9, the first terminal conductor 1 is electrically connected to the first inner electrodes 22 to 24 through the first outer connecting conductor 5 and first inner electrode 21. Also, in the first capacitor C1, the second terminal conductor 2 is electrically connected to the second inner electrodes 41 to 43 through the second outer connecting conductors 6A, 6B and second inner electrode 44. These make the first capacitor C1 have an equivalent series resistance greater than that of the conventional capacitor in a multilayer capacitor array in which all the inner electrodes are connected to their corresponding terminal conductors through lead conductors.

In the second capacitor C2 in the multilayer capacitor array CA9, the third terminal conductor 3 is electrically connected to the third inner electrodes 62 to 64 through the third outer connecting conductor 7 and third inner electrode 61. Also, in the second capacitor C2, the fourth terminal conductor 4 is electrically connected to the fourth inner electrodes 81 to 83 through the fourth outer connecting conductors 8A, 8B and fourth inner electrode 84. These make the second capacitor C2 have an equivalent series resistance greater than that of the conventional capacitor in a multilayer capacitor array in which all the inner electrodes are connected to their corresponding terminal conductors through lead conductors.

Thus, the multilayer capacitor array CA9 allows each of the first and second capacitors C1, C2 included therein to have an equivalent series resistance greater than that of the conventional capacitor in which all the inner electrodes are connected to their corresponding terminal conductors through lead conductors.

As explained in the foregoing, the multilayer capacitor array CA9 can regulate the equivalent series resistance.

The first capacitor C1 can set the equivalent series resistance to a desirable value by adjusting the number or position in the laminating direction of at least one species of first inner electrode 21 and second inner electrode 44. The second capacitor C2 can set the equivalent series resistance to a desirable value by adjusting the number or position in the laminating direction of at least one species of third inner electrode 61 and fourth inner electrode 84. Consequently, the multilayer capacitor array CA9 can regulate the equivalent series resistance easily and accurately.

In the multilayer capacitor array CA9, the plurality of first and second inner electrodes 21 to 24, 41 to 44 are positioned so as to oppose each other, with one of the dielectric layers 12 to 18 in between each pair. On the other hand, the plurality of third and fourth inner electrodes 61 to 64, 81 to 84 are positioned so as to oppose each other, with one of the dielectric layers 12 to 18 in between each pair. These allow the capacitors C1, C2 formed in the multilayer capacitor array CA2 to regulate the equivalent series resistance such as to make it greater while increasing the capacitance.

Though preferred embodiments of the present invention are explained in detail in the foregoing, the present invention is not limited to the above-mentioned embodiments. For example, the number of capacitors included in the multilayer capacitor array is not limited to those stated in the above-mentioned embodiments but may be 3 or more, for example. The number of laminated dielectric layers 11 to 19 and the numbers of laminated first to fourth inner electrodes 21 to 24, 41 to 44, 61 to 64, 81 to 84 are not limited to those stated in the above-mentioned embodiments. It will be sufficient, for example, if at least two layers each of the first and second inner electrodes and at least one layer each of the third and fourth inner electrodes are included.

Figure 19:
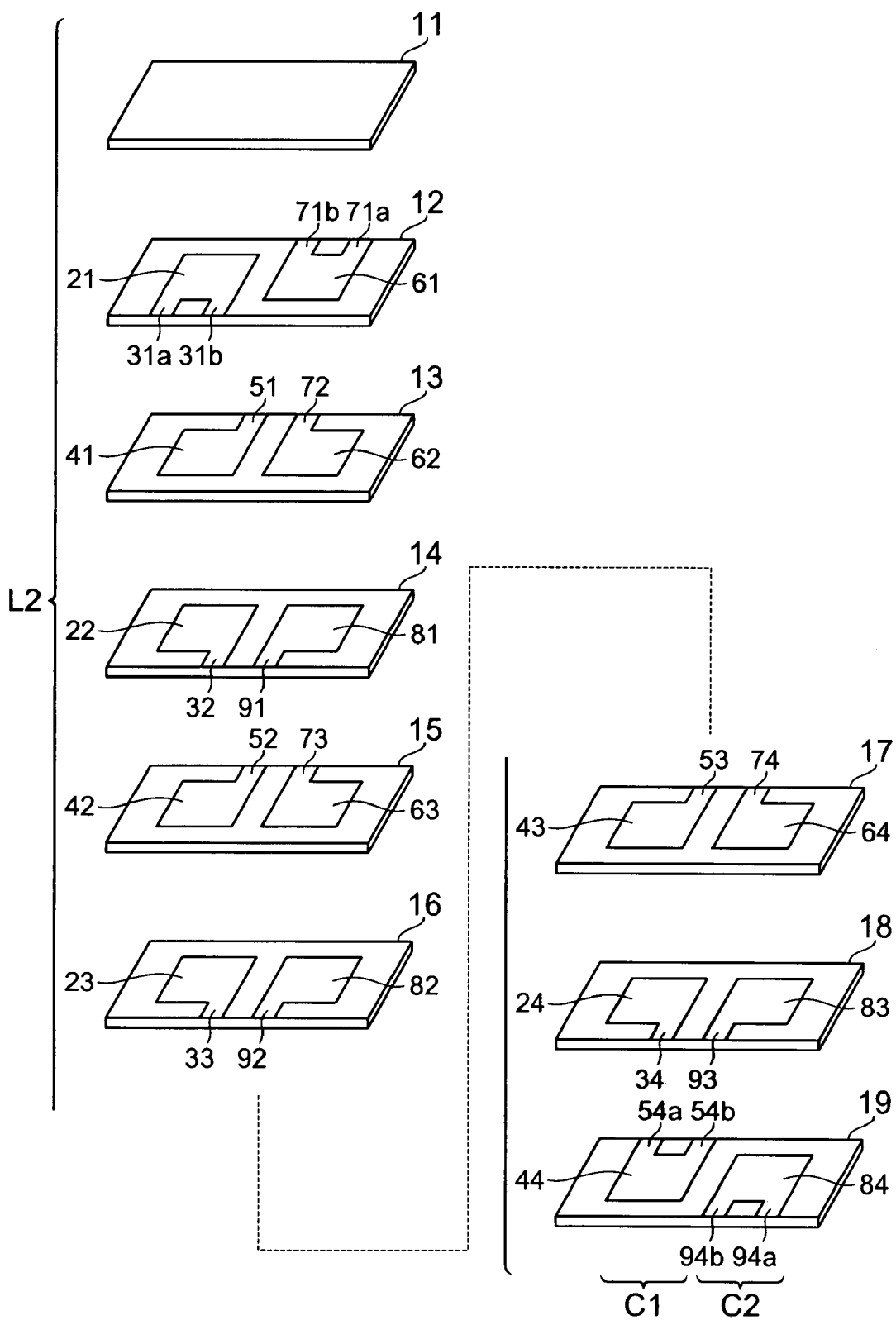
FIG. 19 is an exploded perspective view of the multilayer body included in a modified example of the multilayer capacitor array in accordance with the second embodiment.
Figure 20:
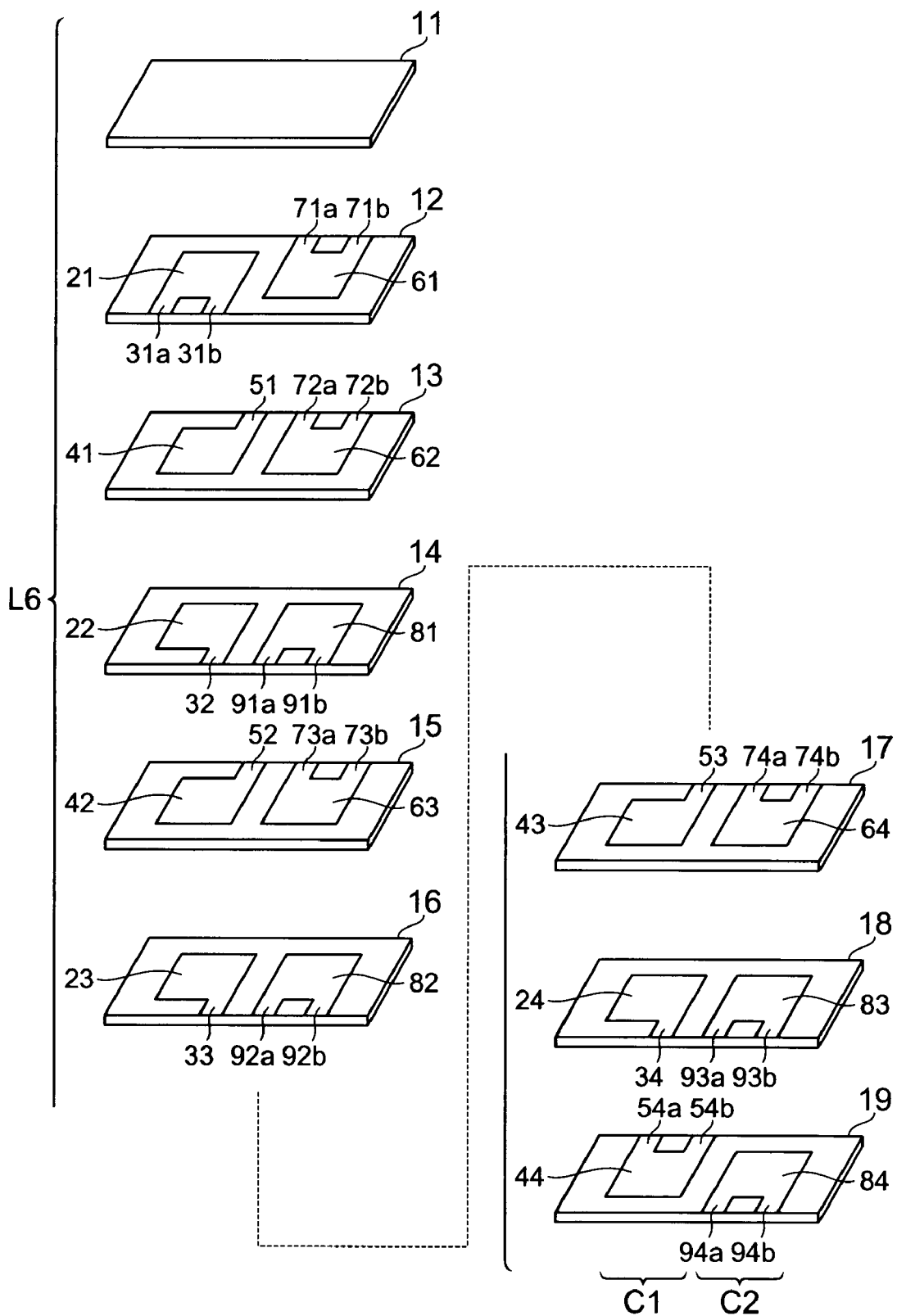
FIG. 20 is an exploded perspective view of the multilayer body included in a modified example of the multilayer capacitor array in accordance with the sixth embodiment.
Figure 21:
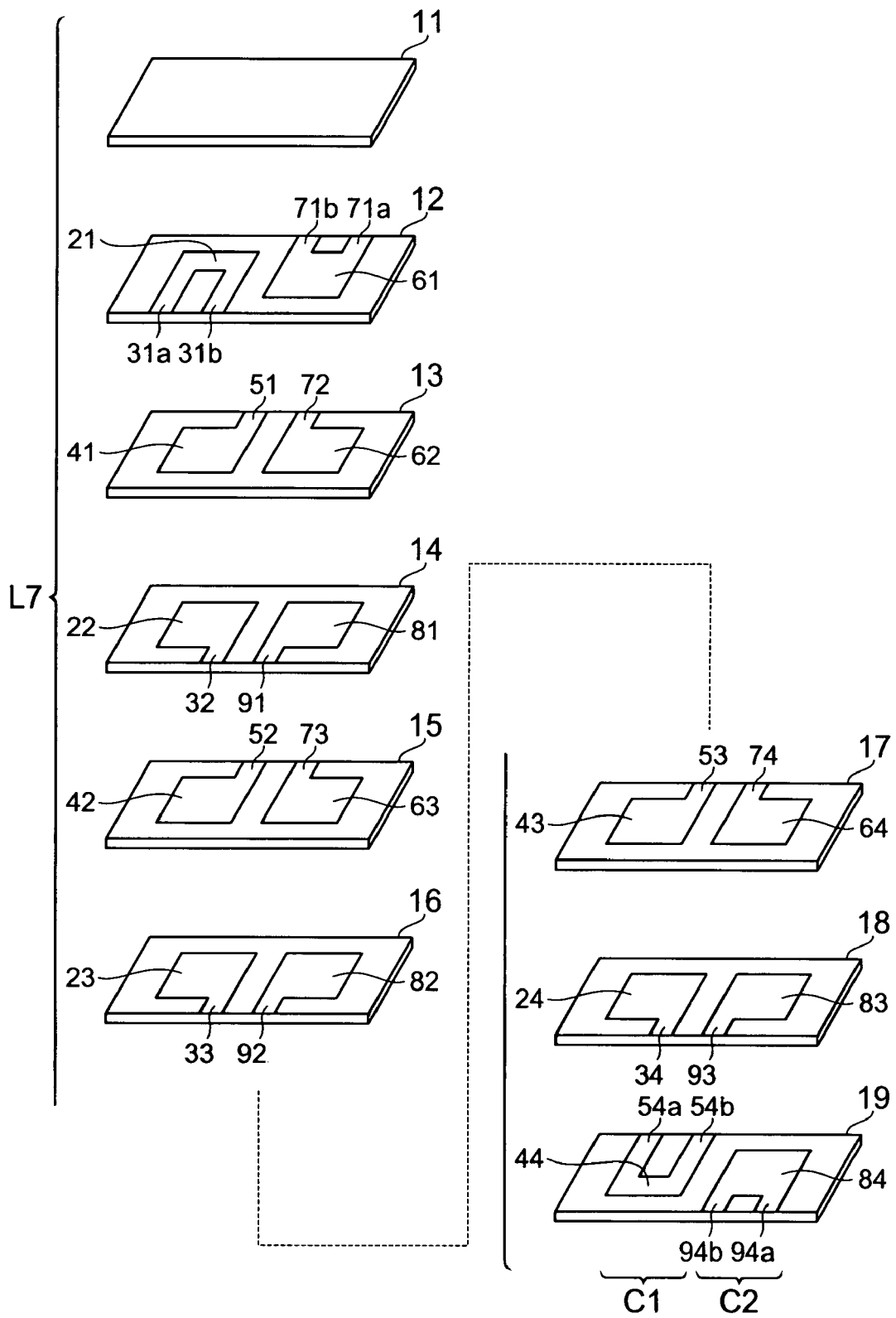
FIG. 21 is an exploded perspective view of the multilayer body included in a modified example of the multilayer capacitor array in accordance with the seventh embodiment.

It will also be sufficient if at least one first inner electrode in the plurality of first inner electrodes 21 to 24 and at least one second inner electrode in the plurality of second inner electrodes 41 to 44 are positioned so as to oppose each other with at least one dielectric layer in between. On the other hand, it will be sufficient if at least one third inner electrode in the plurality of third inner electrodes 61 to 64 and at least one fourth inner electrode in the plurality of fourth inner electrodes 81 to 84 are positioned so as to oppose each other with at least one dielectric layer in between. Therefore, as shown in FIGS. 19, 20, and 21, the third inner electrodes 61 and 62 may be positioned so as to oppose each other with the dielectric layer 12 in between, and the fourth inner electrodes 83 and 84 may be positioned so as to oppose each other with the dielectric layer 18 in between, for example. FIGS. 19, 20, and 21 show modified examples of the second, sixth, and seventh embodiments, respectively. In these cases, the plurality of first and second inner electrodes 21 to 24, 41 to 44 oppose each other, with one of the dielectric layers 12 to 18 in between each pair. The plurality of third and fourth inner electrodes 62 to 64, 81 to 83 oppose each other, with one of the dielectric layers 13 to 17 in between each pair.

It is not necessary for the first and third inner electrodes 21 to 24, 61 to 64 to be positioned on the same layers. It is not necessary for the second and fourth inner electrodes 41 to 44, 81 to 84 to be positioned on the same layers. The forms of the first to fourth inner electrodes 22 to 24, 41 to 43, 62 to 64, 81 to 83 are not restricted to those described in the above-mentioned embodiments as long as they are electrically connected to their corresponding outer connecting conductors. The forms of the first to fourth inner electrodes 21, 44, 61, 84 are not restricted to those described in the above-mentioned embodiments as long as they are electrically connected to their corresponding terminal conductors and outer connecting conductors.

The number of terminal conductors 1, 1A, 1B, 2, 3, 3A, 3B, 4 is not limited to those stated in the above-mentioned embodiments. The number of outer connecting conductors 5, 6, 6A, 6B, 7, 8, 8A, 8B is not limited to those stated in the above-mentioned embodiments. The numbers of first to fourth terminal conductors 1, 1A, 1B, 2, 3, 3A, 3B, 4 may differ from each other. The numbers of first to fourth outer connecting conductors 5, 6, 6A, 6B, 7, 8, 8A, 8B may differ from each other.

The number and position in the laminating direction of the inner electrodes connected to the terminal conductors 1, 1A, 1B, 2, 3, 3A, 3B, 4 through lead conductors are not limited to those stated in the above-mentioned embodiments.

The number of inner electrodes may differ between capacitors included in the multilayer capacitor array. It is not necessary for the first and third inner electrodes 21 to 24, 61 to 64 to be positioned on the same layers in the laminating direction. It is not necessary for the second and fourth inner electrodes 41 to 44, 81 to 84 to be positioned on the same layers in the laminating direction.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multilayer capacitor array comprising a multilayer body having a plurality of dielectric layers laminated, and a plurality of outer conductors formed on the multilayer body;

wherein the plurality of outer conductors include first to fourth terminal conductors and first and second outer connecting conductors electrically insulated from each other;

wherein the multilayer body includes a first electrode group having a plurality of first inner electrodes and a plurality of second inner electrodes, and a second electrode group having a third inner electrode and a fourth inner electrode;

wherein the first and second electrode groups are arranged in parallel in a direction orthogonal to a laminating direction of the plurality of dielectric layers within the multilayer body;

wherein at least one first inner electrode in the plurality of first inner electrodes and at least one second inner electrode in the plurality of second inner electrodes are positioned so as to oppose each other with at least one of the dielectric layers in between;

wherein the third and fourth inner electrodes are positioned so as to oppose each other with at least one of the dielectric layers in between;

wherein each of the first inner electrodes is electrically connected to the first outer connecting conductor through a lead conductor;

wherein each of the second inner electrodes is electrically connected to the second outer connecting conductor through a lead conductor;

wherein the third inner electrode is electrically connected to the third terminal conductor through a lead conductor;

wherein the fourth inner electrode is electrically connected to the fourth terminal conductor through a lead conductor;

wherein at least one first inner electrode whose number is smaller than the total number of the first inner electrodes by at least one in the plurality of first inner electrodes is electrically connected to the first terminal conductor through a lead conductor; and wherein at least one second inner electrode whose number is smaller than the total number of the second inner electrodes by at least one in the plurality of second inner electrodes is electrically connected to the second terminal conductor through a lead conductor.

2. A multilayer capacitor array according to claim 1, wherein the plurality of first and second inner electrodes are positioned so as to oppose each other, with at least one of the dielectric layers in between each pair.

3. A multilayer capacitor array according to claim 1, wherein the plurality of outer conductors further include third and fourth outer connecting conductors;

wherein the second electrode group has a plurality of the third and fourth inner electrodes;

wherein each of the third inner electrodes is electrically connected to the third outer connecting conductor through a lead conductor;

wherein each of the fourth inner electrodes is electrically connected to the fourth outer connecting conductor through a lead conductor;

wherein at least one third inner electrode whose number is smaller than the total number of the third inner electrodes by at least one in the plurality of third inner electrodes is electrically connected to the third terminal conductor through a lead conductor; and wherein at least one fourth inner electrode whose number is smaller than the total number of the fourth inner electrodes by at least one in the plurality of fourth inner electrodes is electrically connected to the fourth terminal conductor through a lead conductor.

4. A multilayer capacitor array according to claim 1, wherein the plurality of first and second inner electrodes and the plurality of dielectric layers form a first capacitor;

wherein the plurality of third and fourth inner electrodes and the plurality of dielectric layers form a second capacitor; and wherein the first capacitor has an equivalent series resistance different from that of the second capacitor.

* * * * *